United States Patent
Rahman et al.

(10) Patent No.: US 10,985,823 B2
(45) Date of Patent: Apr. 20, 2021

(54) METHOD AND APPARATUS FOR CODEBOOK SUBSET RESTRICTION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/809,330

(22) Filed: Mar. 4, 2020

(65) Prior Publication Data

US 2020/0295813 A1  Sep. 17, 2020

Related U.S. Application Data

(60) Provisional application No. 62/928,611, filed on Oct. 31, 2019, provisional application No. 62/925,431, (Continued)

(51) Int. Cl.
   *H04B 7/04* (2017.01)
   *H04B 7/06* (2006.01)
   (Continued)

(52) U.S. Cl.
   CPC ......... *H04B 7/0626* (2013.01); *H04B 7/0639* (2013.01); *H04B 17/101* (2015.01); *H04L 5/0007* (2013.01)

(58) Field of Classification Search
   CPC .. H04B 7/0621; H04B 7/0623; H04B 7/0626; H04B 7/063; H04B 7/0632;
   (Continued)

(56) References Cited

U.S. PATENT DOCUMENTS

| 10,749,583 B2 | 8/2020 | Park et al. |
| 2013/0194943 A1* | 8/2013 | Davydov ............ H04L 1/1896 370/252 |

(Continued)

FOREIGN PATENT DOCUMENTS

| WO | 2018/226581 A1 | 12/2018 |
| WO | 2018/230966 A1 | 12/2018 |
| WO | 2019/045500 A1 | 3/2019 |

OTHER PUBLICATIONS

"LTE; Evolved Universal Terrestrial Radio Access (E-UTRA); Physical channels and modulation (3GPP TS 36.211 version 15.4.0 Release 15)", ETSI TS 136 211 V15.4.0, May 2019, 242 pages.

(Continued)

Primary Examiner — Siu M Lee

(57) ABSTRACT

A method for operating a user equipment (UE) for channel state information (CSI) reporting in a wireless communication system comprises receiving, from a base station (BS), higher layer signaling including codebook subset restriction (CBSR) information, determining a bitmap sequence B based on the CBSR information, identifying, based on a portion of the bitmap sequence B, a restriction on P spatial domain (SD) vector groups out of a total of Q SD vector groups, generating a CSI report based on the P SD vector groups with the identified restriction and remaining Q minus P SD vector groups without any restrictions, and transmitting the CSI report to the BS, wherein the restriction on P SD vector groups corresponds to restricting an average amplitude ($A_i^{avg}$) associated with an SD vector $a_i$ in the P SD vector groups to a maximum allowed average amplitude ($\gamma_i$).

20 Claims, 12 Drawing Sheets

Related U.S. Application Data filed on Oct. 24, 2019, provisional application No. 62/914,890, filed on Oct. 14, 2019, provisional application No. 62/902,065, filed on Sep. 18, 2019, provisional application No. 62/895,143, filed on Sep. 3, 2019, provisional application No. 62/892,149, filed on Aug. 27, 2019, provisional application No. 62/818,876, filed on Mar. 15, 2019.

(51) Int. Cl.
*H04B 17/10* (2015.01)
*H04L 5/00* (2006.01)

(58) Field of Classification Search
CPC .. H04B 7/0636; H04B 7/0639; H04B 7/0658; H04B 17/101; H04L 5/0007
See application file for complete search history.

(56) References Cited

U.S. PATENT DOCUMENTS

| | | | |
|---|---|---|---|
| 2018/0343046 A1* | 11/2018 | Park | H04B 7/0626 |
| 2019/0068256 A1* | 2/2019 | Muruganathan | H04B 7/0626 |
| 2019/0068267 A1* | 2/2019 | Rahman | H04B 7/0408 |
| 2020/0220591 A1* | 7/2020 | Zhang | H04B 7/046 |

OTHER PUBLICATIONS

"LTE; Evolved Universal Terrestrial Radio Access (E-UTRA); Multiplexing and channel coding (3GPP TS 36.212 version 15.4.0 Release 15)", ETSI TS 136 212 V15.4.0, Apr. 2019, 249 pages.
"LTE; Evolved Universal Terrestrial Radio Access (E-UTRA); Physical layer procedures (3GPP TS 36.213 version 15.4.0 Release 15)", ETSI TS 136 213 V15.4.0, May 2019, 551 pages.
"LTE; Evolved Universal Terrestrial Radio Access (E-UTRA); Medium Access Control (MAC) protocol specification (3GPP TS 36.321 version 15.4.0 Release 15)", ETSI TS 136 321 V15.4.0, Apr. 2019, 133 pages.
"LTE; Evolved Universal Terrestrial Radio Access (E-UTRA); Radio Resource Control (RRC); Protocol specification (3GPP TS 36.331 version 15.4.0 Release 15)", ETSI TS 136 331 V15.4.0, Apr. 2019, 929 pages.
"3rd Generation Partnership Project;Technical Specification Group Services and System Aspects; Feasibility Study on New Services and Markets Technology Enablers; Stage 1 (Release 14)", 3GPP TR 22.891 V14.2.0, Sep. 2016, 95 pages.
"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Physical layer procedures for control (Release 15)" 3GPP TS 38.213 V15.4.0, Dec. 2018, 104 pages.
Ericsson, "On CSI enhancements for MU-MIMO", 3GPP TSG RAN WG1 Meeting #96, Feb. 25-Mar. 1, 2019, R1-1903376, 13 pages.
Huawei, HiSilicon, "Codebook Subset Restriction in advanced CSI", 3GPP TSG RAN WG1 Meeting #92, Feb. 26-Mar. 2, 2018, R1-1801870, 5 pages.
International Search Report dated Jun. 26, 2020 in connection with International Patent Application No. PCT/KR2020/003371, 3 pages.

* cited by examiner

US 10,985,823 B2

METHOD AND APPARATUS FOR CODEBOOK SUBSET RESTRICTION

CROSS-REFERENCE TO RELATED APPLICATION(S) AND CLAIM OF PRIORITY

The present application claims priority to U.S. Provisional Patent Application No. 62/818,876 filed on Mar. 15, 2019, U.S. Provisional Patent Application No. 62/892,149, filed on Aug. 27, 2019, U.S. Provisional Patent Application No. 62/895,143, filed on Sep. 3, 2019, U.S. Provisional Patent Application No. 62/902,065, filed on Sep. 18, 2019, U.S. Provisional Patent Application No. 62/914,890, filed on Oct. 14, 2019, U.S. Provisional Patent Application No. 62/925,431, filed on Oct. 24, 2019, and U.S. Provisional Patent Application No. 62/928,611, filed on Oct. 31, 2019. The content of the above-identified patent documents is incorporated herein by reference.

TECHNICAL FIELD

The present disclosure relates generally to wireless communication systems and more specifically to codebook subset restriction for channel state information (CSI) reporting.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for codebook subset restriction for CSI reporting in a wireless communication system.

In one embodiment, a UE for channel state information (CSI) reporting in a wireless communication system is provided. The UE includes a transceiver configured to receive, from a base station (BS), higher layer signaling including codebook subset restriction (CBSR) information. The UE further includes a processor operably connected to the transceiver. The processor is configured to: determine a bitmap sequence B based on the CBSR information, identify, based on a portion of the bitmap sequence B, a restriction on P spatial domain (SD) vector groups out of a total of Q SD vector groups, and generate a CSI report based on the P SD vector groups with the identified restriction and remaining Q minus P SD vector groups without any restrictions. The transceiver is further configured to transmit the CSI report to the BS, wherein the restriction on P SD vector groups corresponds to restricting an average amplitude $(A_i^{avg})$ associated with an SD vector $a_1$ in the P SD vector groups to a maximum allowed average amplitude $(\gamma_i)$.

In another embodiment, a BS in a wireless communication system is provided. The BS includes a processor configured to generate higher layer signaling including codebook subset restriction (CBSR) information. The BS further includes a transceiver operably connected to the processor. The transceiver is configured to: transmit, to a user equipment (UE), the higher layer signaling including the codebook subset restriction (CBSR) information, and receive, from the UE, a channel state information (CSI) report, wherein a bitmap sequence B is determined based on the CBSR information, wherein a restriction on P spatial domain (SD) vector groups out of a total of Q SD vector groups is identified based on a portion of the bitmap sequence B, wherein the CSI report is generated based on the P SD vector groups with the identified restriction and remaining Q minus P SD vector groups without any restrictions, and wherein the restriction on P SD vector groups corresponds to restricting an average amplitude $(A_i^{avg})$ associated with an SD vector $a_1$ in the P SD vector groups to a maximum allowed average amplitude $(\gamma_i)$.

In yet another embodiment, a method for operating a UE for channel state information (CSI) reporting in a wireless communication system is provided. The method comprises: receiving, from a base station (BS), higher layer signaling including codebook subset restriction (CBSR) information; determining a bitmap sequence B based on the CBSR information; identifying, based on a portion of the bitmap sequence B, a restriction on P spatial domain (SD) vector groups out of a total of Q SD vector groups; generating a CSI report based on the P SD vector groups with the identified restriction and remaining Q minus P SD vector groups without any restrictions; and transmitting the CSI report to the BS, wherein the restriction on P SD vector groups corresponds to restricting an average amplitude $(A_i^{avg})$ associated with an SD vector $a_1$ in the P SD vector groups to a maximum allowed average amplitude $(\gamma_i)$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
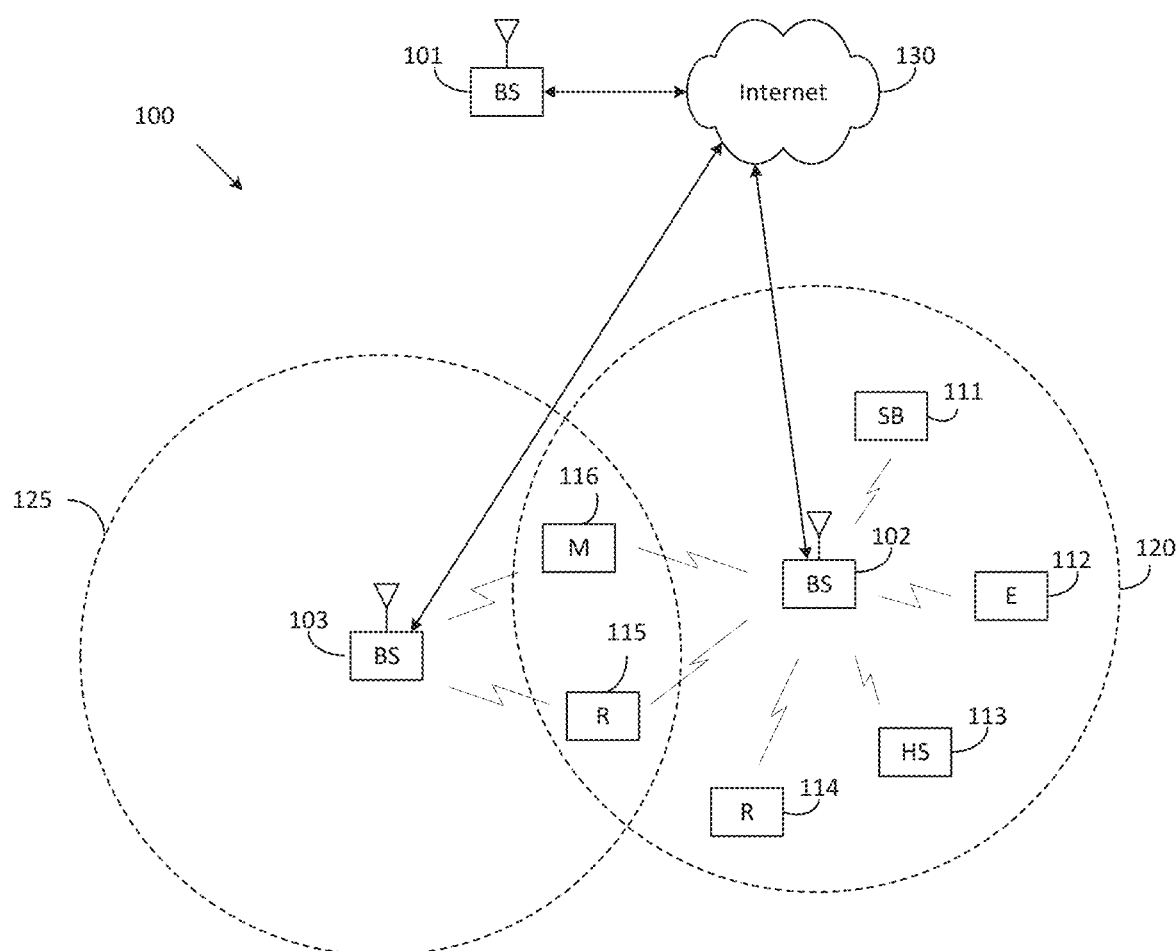
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.0.0, "E-UTRA, Physical channels and modulation;" 3GPP TS 36.212 v16.0.0, "E-UTRA, Multiplexing and Channel coding;" 3GPP TS 36.213 v16.0.0, "E-UTRA, Physical Layer Procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) protocol specification;" 3GPP TR 22.891 v14.2.0; 3GPP TS 38.211 v16.0.0, "E-UTRA, NR, Physical channels and modulation;" 3GPP TS 38.213 v16.0.0, "E-UTRA, NR, Physical Layer Procedures for control;" 3GPP TS 38.214 v16.0.0, "E-UTRA, NR, Physical layer procedures for data;" and 3GPP TS 38.212 v16.0.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD- MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
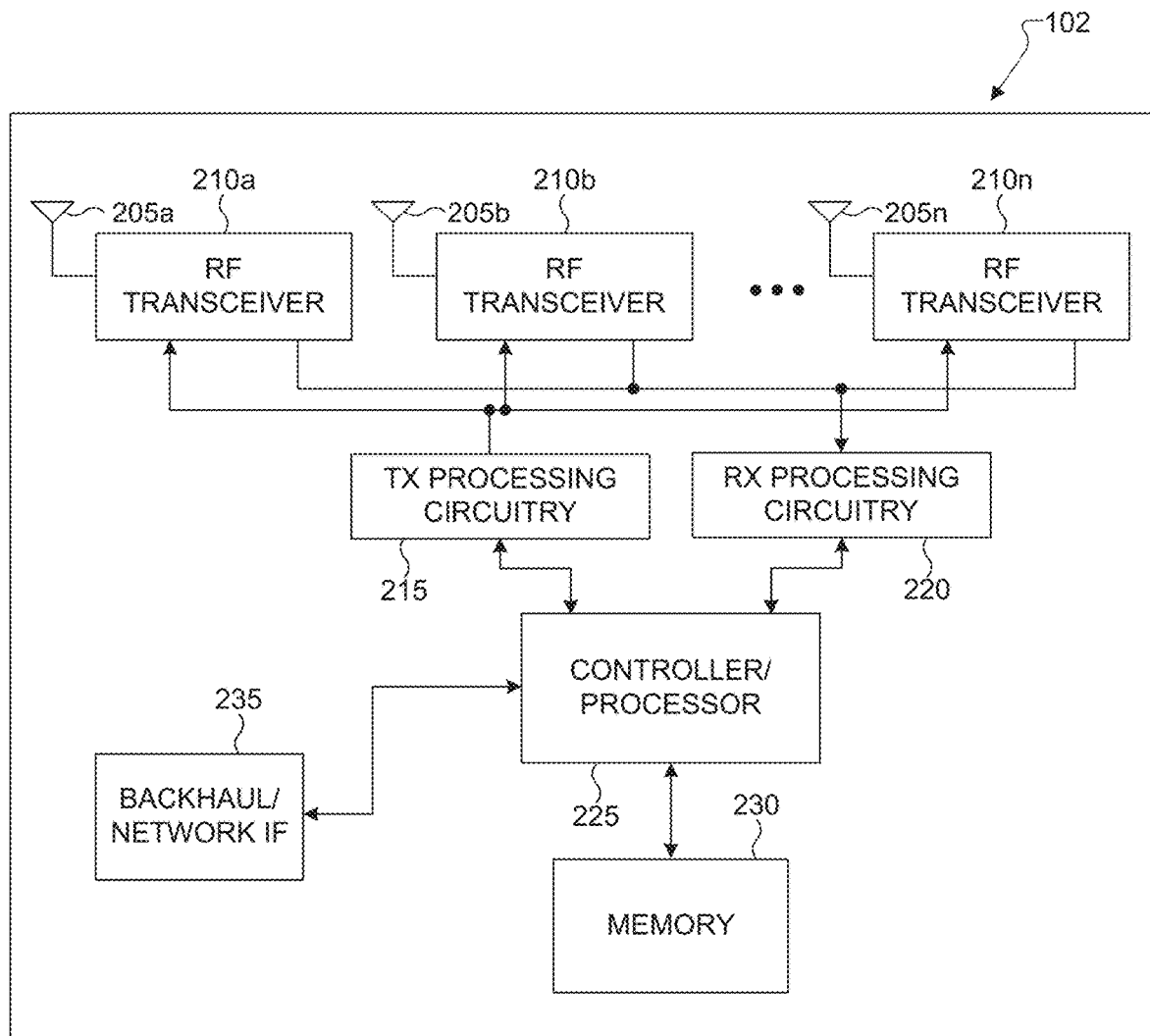
FIG. 2 illustrates an example gNB according to embodiments of the present disclosure.
Figure 3:
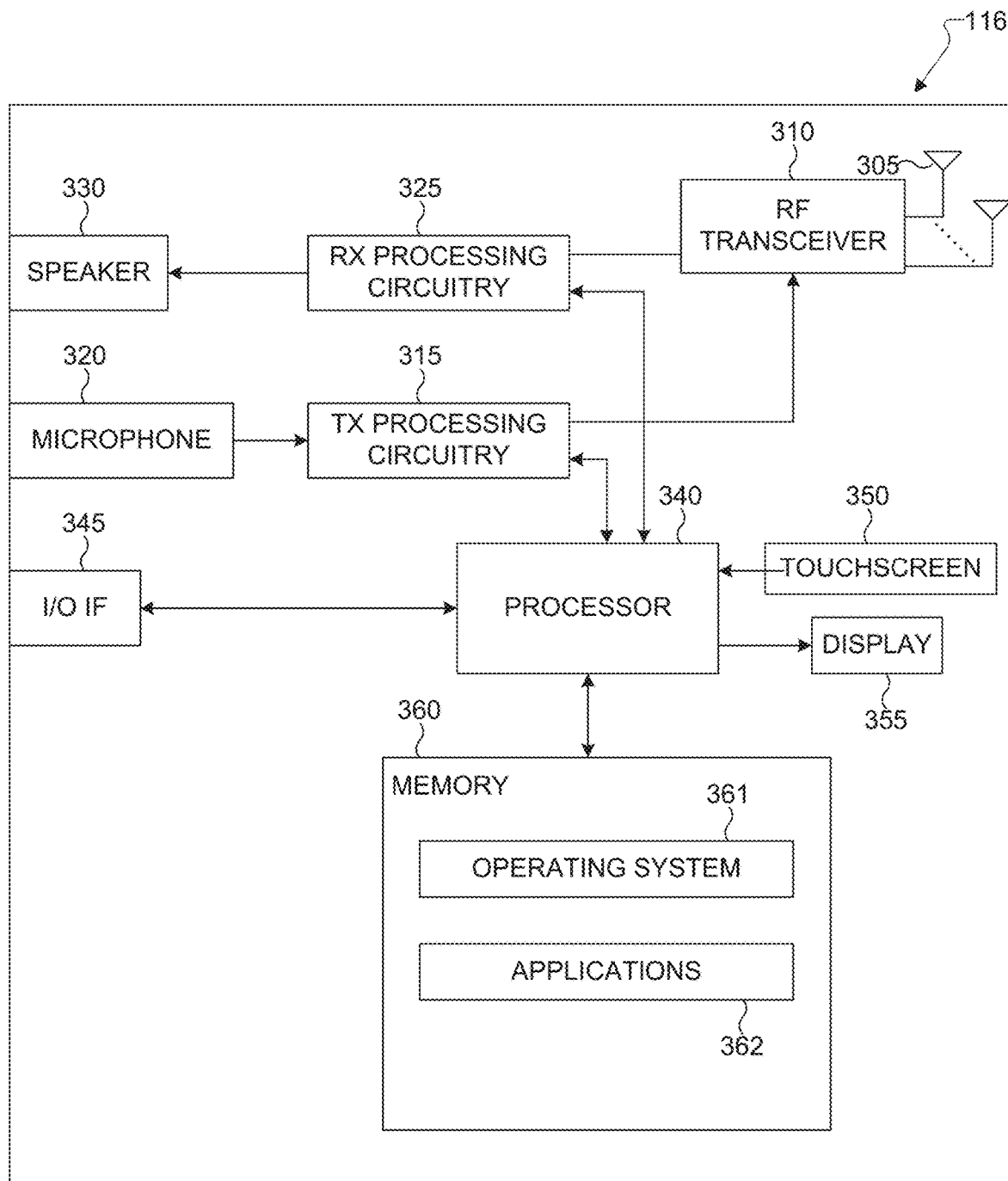
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for utilizing a codebook subset restriction for CSI reporting for communications in a wireless communication system. In certain embodiments, and one or more of the gNBs 101-103 includes circuitry, programming, or a combination thereof, for CSI acquisition in an wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
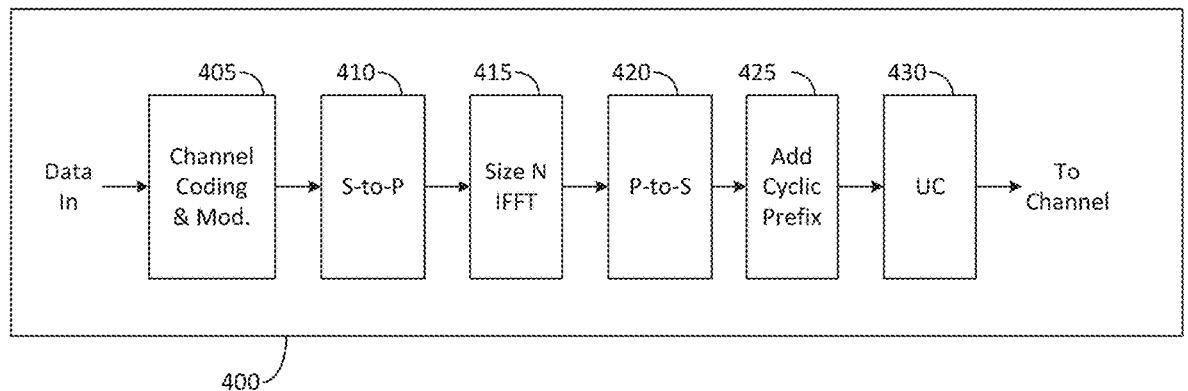
FIG. 4A illustrates a high-level diagram of an orthogonal frequency division multiple access transmit path according to embodiments of the present disclosure.
Figure 4B:
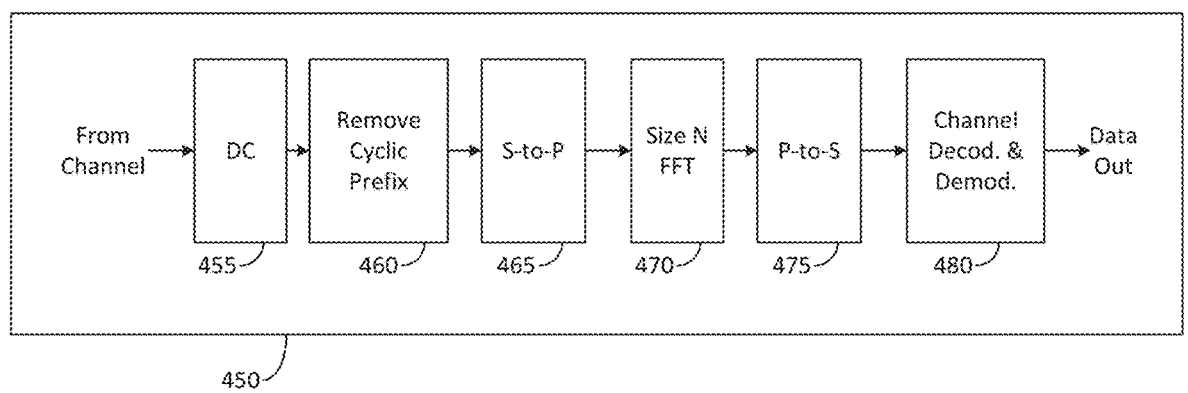
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (1-4141) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
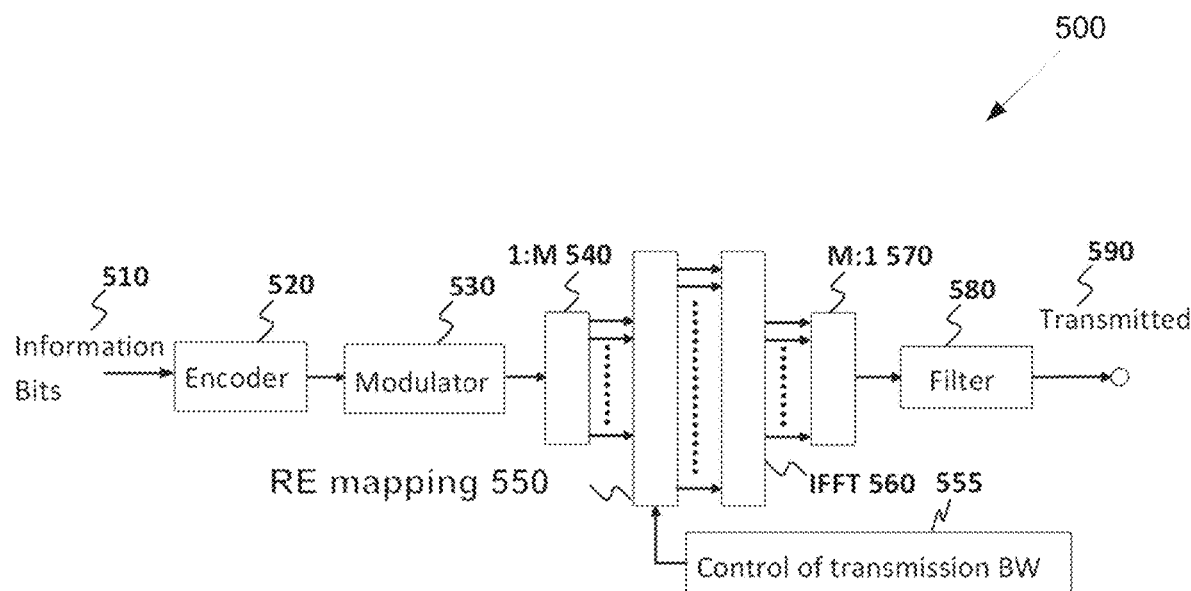
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
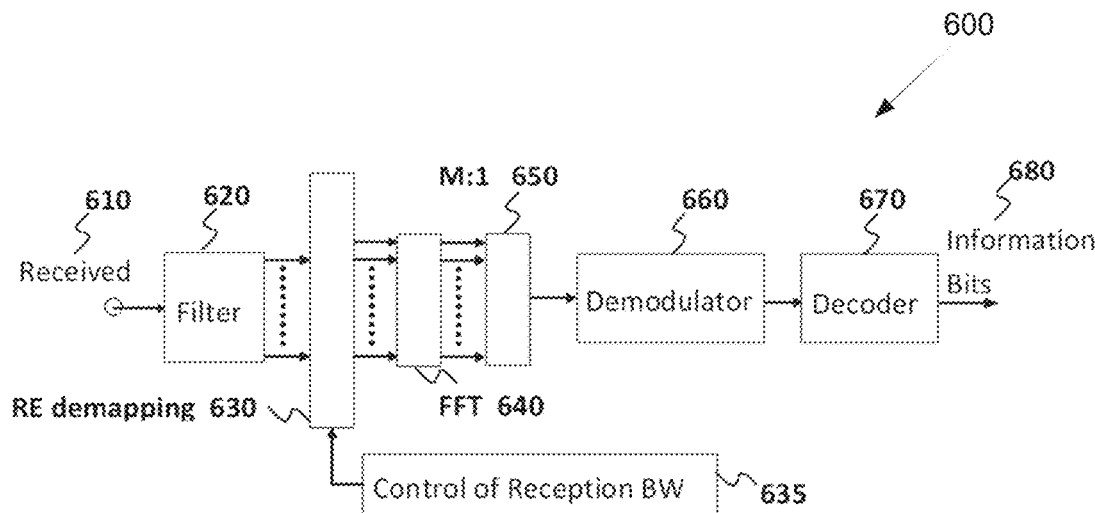
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (1-141), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
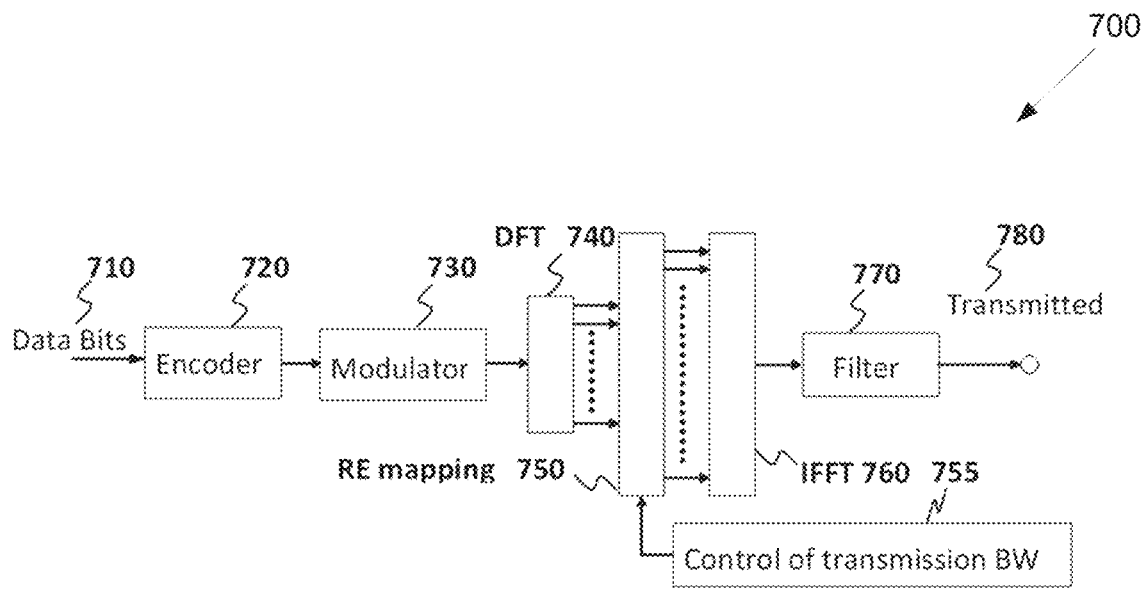
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
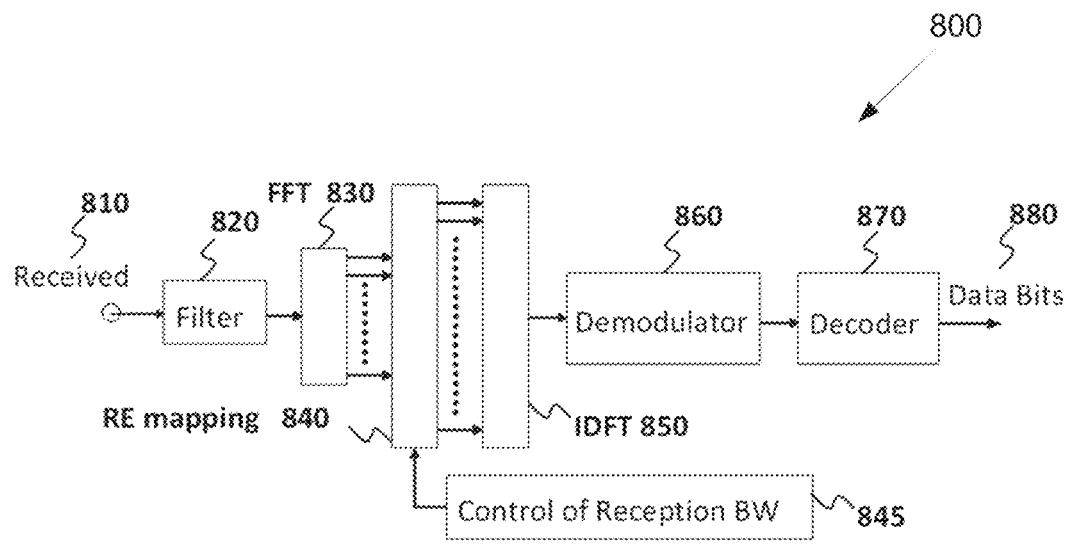
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
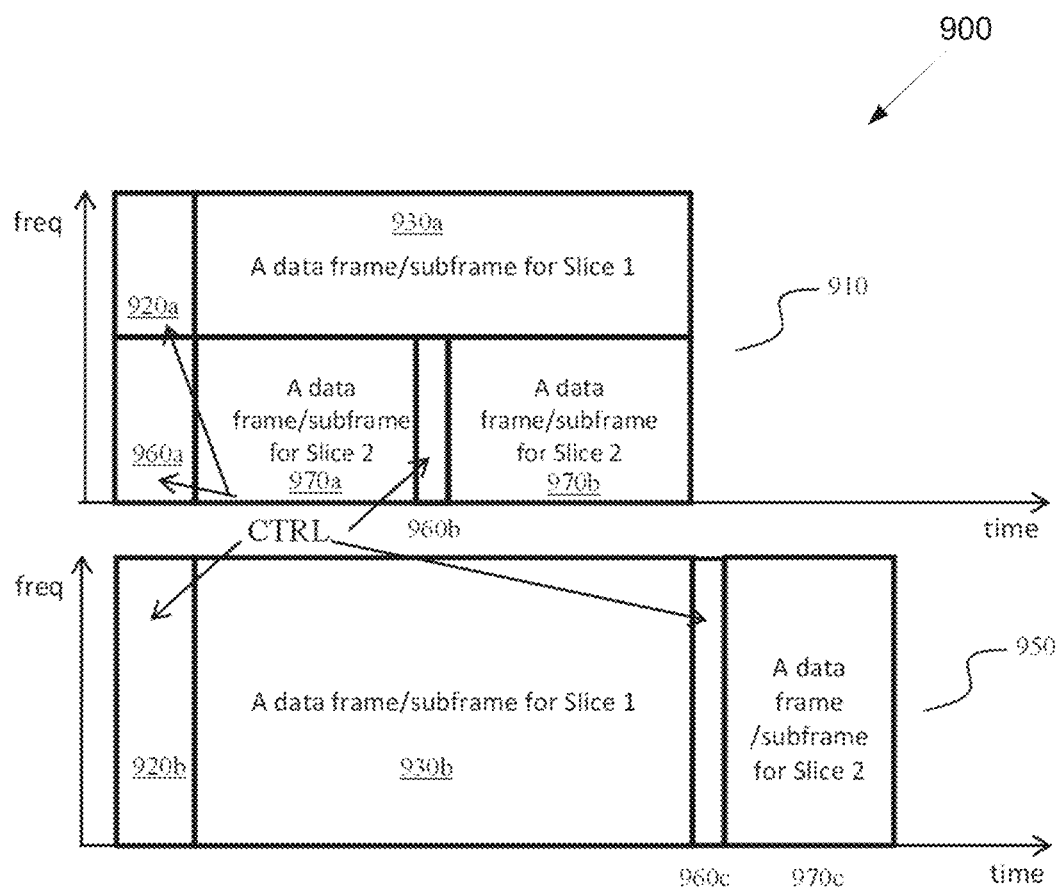
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. One or more of the components illustrated in FIG. 5 can be implemented in specialized circuitry configured to perform the noted functions or one or more of the components can be implemented by one or more processors executing instructions to perform the noted functions. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
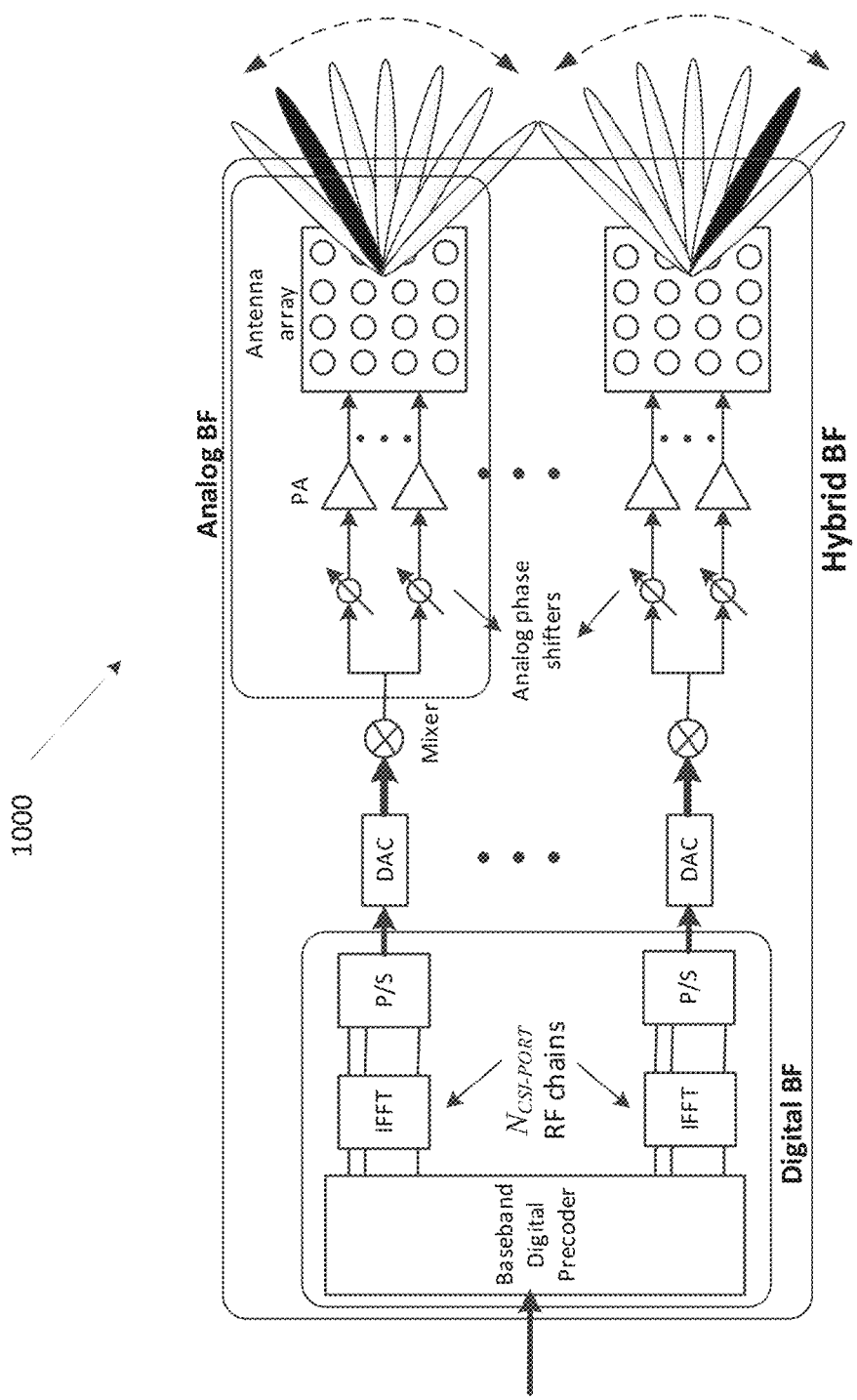
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g. via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with M subbands when one CSI parameter for all the M subbands within the CSI reporting band. A CSI parameter is configured with "subband" for the CSI reporting band with M subbands when one CSI parameter is reported for each of the $M_n$ subbands within the CSI reporting band.

Figure 11:
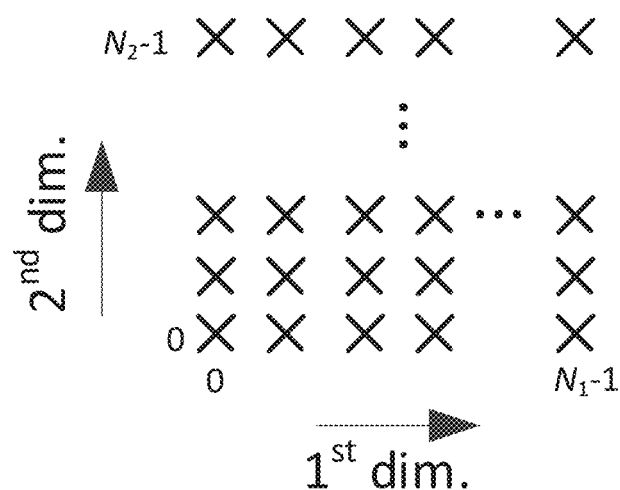
FIG. 11 illustrates an antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. So, for a dual-polarized antenna port layout, the total number of antenna ports is $2N_1N_2$.

In the 3GPP NR specification, when the UE is configured with higher layer parameter codebookType set to 'typeII' or 'typeII-PortSelection', each PMI value corresponds to the codebook indices $i_1$ and $i_2$. When codebookType='typeII', the first PMI $i_1$ comprises two layer-common (i.e., reported common for two layers if the UE reports RI=2) components indicating an orthogonal basis set comprising $N_1N_2$ orthogonal discrete Fourier transform (DFT) beams/vectors (indicated using indicator $i_{1,1}$ indicating the rotation factors $(q_1, q_2)$) and L out of $N_1N_2$ beam/vector selection (indicated using indicator $i_{1,2}$), and two layer-specific (i.e., reported for each of the two layers if the UE reports RI=2) components indicating a strongest coefficient (indicated using indicators $i_{1,3,1}$ and $i_{1,3,2}$) and a WB amplitude coefficient $p_{1,i}^{(1)}$ (indicated using indicators $i_{1,4,1}$ and $i_{1,4,2}$).

When codebookType='typeII-PortSelection', the first PMI $i_1$ comprises a layer-common (i.e., reported common for two layers if UE reports RI=2) component indicating L out of $P_{CSI-RS}/2$ port selection (indicated using indicator $i_{1,1}$).

The values of $N_1$ and $N_2$ are configured with the higher layer parameter n1-n2-codebookSubsetRestriction. The supported configurations of $(N_1, N_2)$ for a given number of CSI-RS ports and the corresponding values of $(O_1, O_2)$ are given. The number of CSI-RS ports is $2N_1N_2$. The number of CSI-RS ports is given by $P_{CSI-RS} \in \{4, 8, 12, 16, 24, 32\}$ as configured by higher layer parameter nrofPorts. The value of L is configured with the higher layer parameter numberOfBeams.

The first PMI $i_1$ is given by $$i_1 = \begin{cases} [\, i_{1,1} \quad i_{1,2} \quad i_{1,3,1} \quad i_{1,4,1} \,] & v=1 \\ [\, i_{1,1} \quad i_{1,2} \quad i_{1,3,1} \quad i_{1,4,1} \quad i_{1,3,2} \quad i_{1,4,2} \,] & v=2 \end{cases}$$

if codebookType set to 'typeII'

$$i_1 = \begin{cases} [\, i_{1,1} \quad i_{1,3,1} \quad i_{1,4,1} \,] & v=1 \\ [\, i_{1,1} \quad i_{1,3,1} \quad i_{1,4,1} \quad i_{1,3,2} \quad i_{1,4,2} \,] & v=2 \end{cases}$$

if codebookType set to 'typeII-PortSelection'.

The second PMI $$i_2 = \begin{cases} [\, i_{2,1,1} \,] & subbandAmplitude = \text{'false'}, v=1 \\ [\, i_{2,1,1} \quad i_{2,1,2} \,] & subbandAmplitude = \text{'false'}, v=2 \\ [\, i_{2,1,1} \quad i_{2,2,1} \,] & subbandAmplitude = \text{'true'}, v=1 \\ [\, i_{2,1,1} \quad i_{2,2,1} \quad i_{2,1,2} \quad i_{2,2,2} \,] & subbandAmplitude = \text{'true'}, v=2 \end{cases}$$

comprises two layer-specific components indicating

SB phase coefficient $c_{1,i}$ indicated using indicators $i_{2,1,1}$ and $i_{2,1,2}$, and SB amplitude coefficient $p_{1,i}^{(2)}$ (which can be turned ON or OFF by RRC signaling via subbandAmplitude) indicated using indicators $i_{2,2,1}$ and $i_{2,2,2}$.

The first PMI is reported in a wideband (WB) manner and the second PMI can be reported in a wideband or subband (SB) manner.

The codebook subset restriction (CBSR) supported for the Type II CSI reporting is illustrated below.

When the UE is configured with higher layer parameter codebookType set to 'typeII', the bitmap parameter typeII-RI-Restriction forms the bit sequence $r_1, r_0$ where $r_0$ is the LSB and $r_1$ is the MSB. When $r_i$ is zero, $i \in \{0,1\}$, PMI and RI reporting are not allowed to correspond to any precoder associated with $v=i+1$ layers. The bitmap parameter n1-n2-codebookSubsetRestriction forms the bit sequence $B=B_1B_2$ where bit sequences $B_1$ and $B_2$ are concatenated to form B. To define $B_1$ and $B_2$, first define the $O_1O_2$ vector groups $G(r_1, r_2)$ as $$G(r_1, r_2) = \{v_{N_1r_1+x_1, N_2r_2+x_2} : x_1=0,1,\ldots, N_1-1; x_2=0,1,\ldots, N_2-1\}$$

for $$r_1 \in \{0,1,\ldots,O_1-1\}$$

$$r_2 \in \{0,1,\ldots,O_2-1\}$$

The UE may be configured with restrictions for 4 vector groups indicated by $(r_1^{(k)}, r_2^{(k)})$ for k=0, 1, 2, 3 and identified by the group indices $$g^{(k)} = O_1 r_2^{(k)} + r_1^{(k)}$$

for k=0, 1, . . . , 3 where for, the indices are assigned such that $g^{(k)}$ increases as k increases. The remaining vector groups are not restricted.

If $N_2=1$, $g^{(k)}=k$ for k=0, 1, . . . , 3 and $B_1$ is empty.

If $N_2>1$, $B_1 = b_1^{(10)} \ldots b_1^{(0)}$ is the binary representation of the integer $\beta_1$ where $b_1^{(10)}$ is the MSB and $b_1^{(0)}$ is the LSB. $\beta_1$ is found using:

$$\beta_1 = \sum_{k=0}^{3} C(O_1 O_2 - 1 - g^{(k)}, 4-k),$$

where C(x, y) is defined in the NR Specification. The group indices g(k) and indicators $(r_1^{(k)}, r_2^{(k)})$ for k=0, 1, 2, 3 may be found from $\beta_1$ using the algorithm:

$s_{-1} = 0$ for k=0, . . . , 3

Find the largest $x^* \in \{3-k, \ldots, O_1 O_2 - 1 - k\}$ such that $\beta_1 - s_{k-1} \geq C(x^*4-k)$ $$e_k = C(x^*, 4-k)$$

$$s_k = s_{k-1} + e_k$$

$$g^{(k)} = O_1 O_2 - 1 - x^*$$

$$r_1^{(k)} = g^{(k)} \bmod O_1$$

$$r_2^{(k)} = \frac{(g^{(k)} - r_1^{(k)})}{O_1}$$

The bit sequence $B_2 = B_2^{(0)} B_2^{(1)} B_2^{(2)} B_2^{(3)}$ is the concatenation of the bit sequences $B_2^{(k)}$ for k=0, 1, . . . , 3 corresponding to the group indices $g^{(k)}$. The bit sequence $B_2^{(k)}$ is defined as $$B_2^{(k)} = b_2^{(k, 2N_1 N_2 - 1)} \ldots b_2^{(k,0)}$$

Bits $b_2^{(k, 2(N_1 x_2 + x_1) + 1)} b_2^{(k, 2(N_1 x_2 + x_1))}$ indicate the maximum allowed amplitude coefficient $p_{1,i}^{(1)}$ for the vector in group $g^{(k)}$ indexed by $x_1, x_2$, where the maximum amplitude coefficients are given in Table 1.

TABLE 1

Maximum allowed amplitude coefficients for restricted vectors

| Bits $b_2^{(k, 2(N_1 x_2 + x_1) + 1)} b_2^{(k, 2(N_1 x_2 + x_1))}$ | Maximum Amplitude Coefficient $p_{l,i}^{(1)}$ |
|---|---|
| 00 | 0 |
| 01 | $\sqrt{1/4}$ |
| 10 | $\sqrt{1/2}$ |
| 11 | 1 |

As described in U.S. patent application Ser. No. 15/490,561, filed Apr. 18, 2017 and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
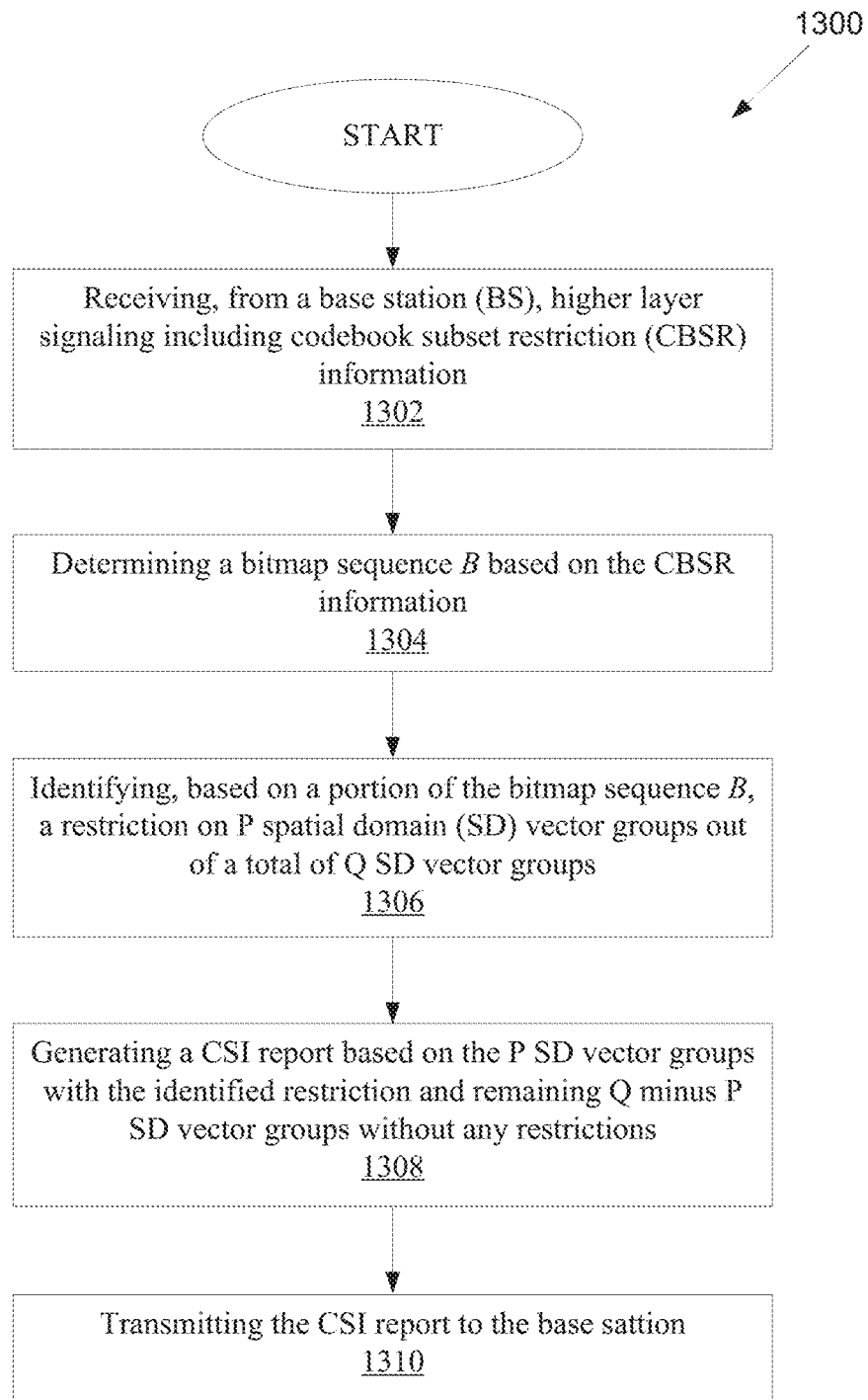
FIG. 13 illustrates a flow chart of a method for transmitting an UL transmission including CSI reporting, as may be performed by a UE according to embodiments of the present disclosure.

FIG. 13 illustrates a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1 = O_2 = O_3 = 4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all SBs and for a given layer l=1, . . . , v, where v is the associated RI value, is given by either $$W^l = AC_l B^H = [a_0 \ a_1 \ \ldots \ a_{L-1}] \begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix} [b_0 \ b_1 \ \ldots \ b_{M-1}]^H = \sum_{m=0}^{M-1}\sum_{i=0}^{L-1} c_{l,i,m}(a_i b_m^H) = \sum_{i=0}^{L-1}\sum_{m=0}^{M-1} c_{l,i,m}(a_i b_m^H),$$

(Eq. 1)

or $$W^l = \begin{bmatrix} A & 0 \\ 0 & A \end{bmatrix} C_l B^H = \begin{bmatrix} a_0 \ a_1 \ \ldots \ a_{L-1} & 0 \\ 0 & a_0 \ a_1 \ \ldots \ a_{L-1} \end{bmatrix} \begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix} [b_0 \ b_1 \ \ldots \ b_{M-1}]^H = \begin{bmatrix} \sum_{m=0}^{M-1}\sum_{i=0}^{L-1} c_{l,i,m}(a_i b_m^H) \\ \sum_{m=0}^{M-1}\sum_{i=0}^{L-1} c_{l,i+L,m}(a_i b_m^H) \end{bmatrix},$$

(Eq. 2)

where $N_1$ is a number of antenna ports in a first antenna port dimension, $N_2$ is a number of antenna ports in a second antenna port dimension, $N_3$ is a number of SBs or frequency domain (FD) units/components for PMI reporting (that comprise the CSI reporting band), which can be different (e.g., less than) from a number of SBs for CQI reporting.

$a_i$ is a $2N_1N_2 \times 1$ (Eq. 1) or $N_1N_2 \times 1$ (Eq. 2) column vector, $b_k$ is a $N_3 \times 1$ column vector, $c_{l,i,m}$ is a complex coefficient.

In the rest of the disclosure, the terms "SB for PMI reporting" and "FD unit for PMI reporting" are used interchangeably since they are equivalent.

In a variation, when a subset K<2LM coefficients (where K is either fixed, configured by the gNB or reported by the UE), then the coefficient $c_{l,i,m}$ in precoder equations Eq. 1 or Eq. 2 is replaced with $v_{l,i,m} \times c_{l,i,m}$, where $v_{l,i,m}=1$ if the coefficient $c_{l,i,m}$ is non-zero, hence reported by the UE according to some embodiments of this disclosure.

$v_{l,i,m}=0$ otherwise (i.e., $c_{l,i,m}$ is zero, hence not reported by the UE).

The indication whether $v_{l,i,m}=1$ or 0 is according to some embodiments of this disclosure.

In a variation, the precoder equations Eq. 1 or Eq. 2 are respectively generalized to $$W^l = \sum_{i=0}^{L-1} \sum_{m=0}^{M_i-1} c_{l,i,m}(a_i b_{i,m}^H) \quad \text{(Eq. 3)}$$

and $$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix}, \quad \text{(Eq. 4)}$$

where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($v=R$), the pre-coding matrix is given by $$W^{(R)} = \frac{1}{\sqrt{R}}[W^1 \ W^2 \ \ldots \ W^R].$$

Eq. 2 is assumed in the rest of the disclosure. The embodiments of the disclosure, however, are general and are also applicable to Eq. 1, Eq. 3 and Eq. 4.

Here $L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L<2N_1N_2$, in an example, to report columns of A, the oversampled DFT codebook is used. For instance, $a_i=v_{l,m}$, where the quantity $v_{l,m}$ is given by:

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T.$$

Similarly, assuming $K<N_3$, in an example, to report columns of B, the oversampled DFT codebook is used. For instance, $b_k=w_k$, where the quantity $w_k$ is given by:

$$w_k = \begin{bmatrix} 1 & e^{j\frac{2\pi k}{O_3 N_3}} & \ldots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1' \end{cases}$$

and $K = N_3$, $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer $l=1, \ldots, v$, where v is the associated RI value, is given by $W^l=AC_l B^H$, where $N_1$, $N_2$, $N_3$, and $c_{l,i,k}$ are defined as above except that the matrix A comprises port selection vectors. For instance, the L antenna ports per polarization or column vectors of A are selected by the index $q_1$, where $$q_1 \in \left\{0, 1, \ldots, \left\lceil \frac{P_{CSI-RS}}{2d} \right\rceil - 1\right\} \left(\text{this requires} \left\lceil \log_2 \left\lceil \frac{P_{CSI-RS}}{2d} \right\rceil \right\rceil \text{bits}\right),$$

and the value of d is configured with the higher layer parameter PortSelectionSamplingSize, where $d \in \{1, 2, 3, 4\}$ and $$d \leq \min\left(\frac{P_{CSI-RS}}{2}, L\right).$$

To report columns of A, the port selection vectors are used, For instance, $a_i=v_m$, where the quantity $v_m$ is a $P_{CSI-RS}/2$-element column vector containing a value of 1 in element (mil $P_{CSI-RS}/2$) and zeros elsewhere (where the first element is element 0).

On a high level, a precoder $W^1$ can be described as follows.

$$W^l = AC_l B^H = W_1 \tilde{W}_2 W_f^H, \quad (5)$$

where $A=W_1$ corresponds to the $W_1$ in Type II CM codebook, i.e., $$W_1 = \begin{bmatrix} A & 0 \\ 0 & A \end{bmatrix}$$

and $B=W_f$. The $C=\tilde{W}_2$ matrix consists of all the required linear combination coefficients (e.g., amplitude and phase or real or imaginary) Note that the coefficients matrix $\tilde{W}_2$ comprises 2LM coefficients.

The first PMI i1 comprises the following components:
  orthogonal basis set for $W_1$ and $W_f$ (which for example, can be indicated using index i1,1 indicating the rotation factors (q1, q2, q3)), $q_i \in \{0, 1, \ldots, O_i-1\}$. In one example, $O_3=1$, hence q3 is fixed and not reported by the UE.
  L beam selection for $W_1$ and M beam selection for $W_f$ (which for example, can be indicated using index i1,2),
  strongest coefficient indicator (SCI) (which for example, can be indicated using index i1,3) indicating the strongest coefficient out of 2LM coefficients comprising $C=W_2$, and
  indices of $N_{0,l}$ non-zero (NZ) coefficients for each layer $l=1, \ldots, v$ (which for example, can be indicated using index i1,4).

Here, i1,1, i1,2, i1,3, and i1,4 are components of the first PMI i1. The indices of NZ coefficients are reported either explicitly using a bitmap $B_l$ of length 2LM or a combinatorial index $$\left\lceil \log_2 \binom{2LM}{N_{0,l}} \right\rceil$$

or is derived implicitly, for example, based on amplitude or power of beams comprising $W_1$ or/and $W_f$. Bitmap $B_l$ is assumed in the rest of the disclosure.

The second PMI i2 comprises the following components:
  phase $\phi_{l,i,m}^{\square}$ of coefficients $c_{l,i,m}$ (which for example, can be indicated using index i2,1) and
  amplitude $p_{l,i,m}^{\square}$ of coefficients $c_{l,i,m}$ (which for example, can be indicated using index i2,2).

Here, i2,1 and i2,2 are components of the second PMI i2. In one example, amplitude $p_{l,i,m}^{\square}=p_{l,i,m}^{(1)}p_{l,i,m}^{(2)}$ where $p_{l,i,m}^{(1)}$ and $p_{l,i,m}^{(2)}$ respectively are first (reference) and second amplitude (differential) coefficients.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $m \in \{0, 1, \ldots, M-1\}$ as $c_{l,i,m}$, and the strongest coefficient as $c_{l,i^*,m^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM-K_{NZ}$ coefficients that are not reported by the UE are assumed to be zero. The following quantization scheme is used to quantize/report amplitude and phase of the $K_{NZ}$ NZ coefficients.

The UE reports the following for the quantization of the NZ coefficients in $\tilde{W}_2$:
  A $\lceil \log_2 K_{NZ} \rceil$-bit indicator for the strongest coefficient index (i*, m*)
  Strongest coefficient $c_{l,i^*,m^*}=1$ (hence its amplitude/phase are not reported)

Two antenna polarization-specific reference amplitudes:
  For the polarization associated with the strongest coefficient $c_{l,i^*,m^*}=1$, since the reference amplitude $p_{l,i,m}^{(1)}=1$, it is not reported)
  For the other polarization, reference amplitude $p_{l,i,m}^{(1)}$ is quantized to 4 bits.
  In one example, the 4-bit amplitude alphabet $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0 \right\}.$$

For $\{c_{l,i,m}, (i, m) \neq (i^*, m^*)\}$:)
  For each polarization, differential amplitudes $p_{l,i,m}^{(2)}$ of the coefficients calculated relative to the associated polarization-specific reference amplitude and quantized to 3 bits.
  In one example, the 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

Note: The final quantized amplitude $p_{l,i,m}$ is given by $p_{l,i,m}^{(1)} \times p_{l,i,m}^{(2)}$ and the coefficient is given by $$c_{l,i,m} = p_{ref}\left(\left\lfloor \frac{i}{L} \right\rfloor\right) \times p_{l,i,m}^{(2)} \times \varphi(l, m)$$

Each phase is quantized to either 8PSK (3-bit) or 16PSK (4-bit) (which is configurable).
Note that $$p_{l,i,m}^{(1)} = p_{ref}\left(\left\lfloor \frac{i}{L} \right\rfloor\right).$$

in one alternative, hero in the 4-bit amplitude alphabet for the reference amplitude is removed and the associated code point is designated as "reserved" which implies that the associated code point is not used in reference amplitude reporting. For $RI \in \{2, 3, 4\}$, different layers are independently quantized.

In one example, for $i \in \{0, 1, \ldots, L-1\}$, the quantized amplitude for (antenna polarizations) k=0, 1 is given by $p_{l,i+kL,m}^{(1)}=p_{l,i+kL,m}^{(2)}$.

In one example, the components SCI, the indices of NZ coefficients, amplitude and phase are reported layer-specific, that is, they are reported independently for each layer. In this case, the indices i1,3, i1,4, i2,1 and i2,2 comprises v sub-indices. For example, when v=2, these indices are expressed further as $$i_{1,3} = \begin{cases} [i_{1,3,1}] & RI = 1 \\ [i_{1,3,1} \ i_{1,3,2}] & RI = 2 \end{cases},$$

$$i_{1,4} = \begin{cases} [i_{1,4,1}] & RI = 1 \\ [i_{1,4,1} \ i_{1,4,2}] & RI = 2 \end{cases},$$

$$i_{2,1} = \begin{cases} [i_{2,1,1}] & RI = 1 \\ [i_{2,1,1} \ i_{2,1,2}] & RI = 2 \end{cases} \text{ and}$$

$$i_{2,2} = \begin{cases} [i_{2,2,1}] & RI = 1 \\ [i_{2,2,1} \ i_{2,2,2}] & RI = 2 \end{cases}.$$

Note that $i_{1,3,2}$, $i_{1,4,2}$, $i_{2,1,2}$, and $i_{2,1,2}$ are reported only when RI=2 is reported.

In the rest of the disclosure, several schemes are proposed for CBSR for the Type II CSI codebook according to the above-mentioned FD compression framework (5).

In embodiment 0, a UE is configured with CBSR via higher layer (e.g., RRC) signaling, wherein the CBSR restricts only SD beams or vectors $v_{l,m}$, and there is no restriction on FD beams or vectors $w_k$. In particular, $N_1O_1$ SD DFT beams for one-dimensional (1D) antenna port layouts (when $N_2=1$) or $N_1N_2O_1O_2$ SD DFT beams for two-dimensional (2D) antenna port layouts (when $N_2>1$) are partitioned into vector groups (or DFT beam groups) G ($r_1$, $r_2$), where (r1, r2) is a vector group indicator. The UE is configured with CBSR via higher layer (e.g. RRC) signaling of a bitmap (or bit sequence) $B=B_1B_2$ or $B_2B_1$, where one part of the bitmap (or bit sequence) $B_1=b_1^{(K_1-1)}b_1^{(K_1-2)} \ldots b_1^{(0)}$ has a fixed length $K_1$, where $b_1^{(K_1-1)}$ is the most significant bit (MSB) and $b_1^{(0)}$ is the least significant bit (LSB), and restricts SD vector groups G ($r_1$, $r_2$) defined as follows.

For 1D port layouts (N2=1), $r_2=0$ and $r_1$ indicates a SD vector group G ($r_1$, $r_2$) comprising $N_1$ adjacent or non-orthogonal SD DFT beams $\{v_{N_1r_1+x_1,0}:x_1=0, 1, \ldots, N_1-1\}$. The range of values for $r_1$ is $\{0, 1, \ldots, O_1-1\}$. The bitmap $B_1$ restricts the values for vector group indicator $r_1$ and hence $K_1=O_1$.

For 2D port layouts (N2>1), ($r_1$, $r_2$) indicates a SD vector group G ($r_1$, $r_2$) comprising $N_1N_2$ adjacent or non-orthogonal SD DFT beams $\{v_{N_1r_1+x_1,N_2r_2+x_2}:x_1=0, 1, \ldots, N_1-1, x_2=0, 1, \ldots, N_2-1\}$. The range of values for $r_1$ is $\{0, 1, \ldots, O_1-1\}$ and the range of values for $r_2$ is $\{0, 1, \ldots, O_2-1\}$. The bitmap $B_1$ restricts the values for vector group indicator ($r_1$, $r_2$) and hence $K_1=O_1O_2$.

The UE may be configured with restrictions for P SD vector groups indicated by ($r_1^{(k)}$, $r_2^{(k)}$) for k=0, 1, ..., P-1 and identified by the group indices $g^{(k)}=O_1r_2^{(k)}+r_1^{(k)}$ for k=0, 1, ..., P-1, where the indices are assigned such that $g^{(k)}$ increases as k increases. The remaining SD vector groups are not restricted.

The value P is either fixed (e.g. P=4) or configured via higher layer RRC or more dynamic MAC CE based or (UL-related or DL-related) DCI signaling.

In one example, when P is fixed, the number of restricted SD vector groups is fixed, hence instead of length $K_1=O_1$ or $O_1O_2$, the length of the bitmap $B_1$ can be reduced to $$K_1 = \left\lceil \log_2 \binom{O_1}{P} \right\rceil$$

bits for 1D port layout and $$K_1 = \left\lceil \log_2 \binom{O_1O_2}{P} \right\rceil$$

bits for 2D port layouts. Alternatively $$K_1 = \left\lceil \log_2 \binom{O_1O_2}{P} \right\rceil$$

for both 1D and 2D port layouts, where ($O_1$, $O_2$)=(4, 1) for 1D port layouts, and ($O_1$, $O_2$)=(4, 4) for 2D port layouts. In this alternative, when P=4 for 1D port layout ($N_2=1$), the length is $K_1=0$ (i.e., $B_1$ is empty, hence not indicated/configured), and $g^{(k)}=k$ for k=0, 1, ..., 3; and for 2D port layout ($N_2>1$), the length is $K_1=11$ bits, hence $B_1=b_1^{(10)} \ldots b_1^{(0)}$ is the eleven bit binary representation of the integer $\beta_1$. Note that $$\beta_1 \in \left\{0, 1, \ldots, \binom{O_1O_2}{P}-1\right\} = \{0, 1, \ldots, 1819\}$$

for $O_1=O_2=4$, and P=4, hence requires 11 bits for binary representation. The group indices $g^{(k)}$ and indicators ($r_1^{(k)}$, $r_2^{(k)}$) for k=0, 1, 2, 3 are as explained above.

In one example, $B_2$ is empty.

In another example, the another part of the bitmap (or bit sequence) $B_2$ has a length that depends on the number (P) of SD vector groups that are restricted (e.g. set to 0) via the first bitmap $B_1$. In particular, $B_2=B_2^{(0)}B_2^{(1)} \ldots B_2^{(P-1)}$ is the concatenation of P bitmaps $B_2^{(k)}$ for k=0, 1, ..., P-1, corresponding to the vector group indices $g^{(k)}$. The k-th bitmap $B_2^{(k)}$ is defined as $B_2^{(k)}=b_2^{(k,K_2-1)}b_2^{(k,K_2-2)} \ldots b_2^{(k,0)}$ and is according to at least one of the following alternatives.

In one alternative Alt 0-0, the bit sequence $B_2^{(k)}$ restricts the second amplitude coefficient $p_{l,i,m}^{(2)}$ for the DFT beams/vectors comprising the vector group G($r_1^{(k)}$,$r_2^{(k)}$) indicated by $g^{(k)}$ via the bit sequence $B_1$. There is no restriction on the first amplitude coefficient $p_{l,i,m}^{(1)}$. At least one of the following sub-alternatives is used.

In one alternative Alt 0-0-0: $K_2=2N_1N_2$, and the bit sequence $B_2^{(k)}$ is defined as $B_2^{(k)}=b_2^{(k,2N_1N_2-1)}b_2^{(k,2N_1N_2-2)} \ldots b_2^{(k,0)}$, where bits $b_2^{(k,2(N_1x_2+x_1)+1)}$ $b_2^{(k,2(N_1x_2+x_1))}$ indicate the maximum allowed second amplitude coefficient $p_{l,i,m}^{(2)}$ for the (DFT) vector in vector group $g^{(k)}$ indexed by ($x_1$, $x_2$), where two examples of the maximum second amplitude coefficients are given in Table 2. Note that here the restriction on the maximum second amplitude coefficient is independent for each beam/vector comprising the k-th vector group.

In one alternative Alt 0-0-1: $K_2=2$, and the bit sequence $B_2^{(k)}$ is defined as $B_2^{(k)}=b_2^{(k,1)}b_2^{(k,0)}$ which indicates the maximum allowed second amplitude coefficient $p_{l,i,m}^{(2)}$ for all (DFT) vectors in vector group $g^{(k)}$, where two examples of the maximum second amplitude coefficients are given in Table 2. Note that here the restriction on the maximum second amplitude coefficient is common for all beams/vectors comprising the k-th vector group.

In one alternative Alt 0-0-2: $K_2=2N_1N_2$, and the bit sequence $B_2^{(k)}$ is defined as $B_2^{(k)}=b_2^{(k,2N_1N_2-1)}b_2^{(k,2N_1N_2-2)} \ldots b_2^{(k,0)}$, where bits $b_2^{(k,2(N_1x_2+x_1)+1)}$ $b_2^{(k,2(N_1x_2+x_1))}$ indicate the only allowed (single value) second amplitude coefficient $p_{l,i,m}^{(2)}$ for the (DFT) vector in vector group $g^{(k)}$ indexed by ($x_1$, $x_2$), where two examples of the only allowed second amplitude coefficients are given in Table 2. Note that here the restriction on the only (single value) second amplitude coefficient is independent for each beam/vector comprising the k-th vector group.

In one alternative Alt 0-0-3: $K_2=2$, and the bit sequence $B_2^{(k)}$ is defined as $B_2^{(k)}=b_2^{(k,1)}b_2^{(k,0)}$ which indicates the only (single value) allowed second amplitude coefficient $p_{l,i,m}^{(2)}$ for all (DFT) vectors in vector group $g^{(k)}$, where two examples of the only allowed second amplitude coefficients are given in Table 2. Note that here the restriction on the only (single value) second amplitude coefficient is common for all beams/vectors comprising the k-th vector group.

In one alternative Alt 0-0-4: $K_2=N_1N_2$ and $b_2^{(k,N_1x_2+x_1)}$ indicate the maximum allowed second amplitude coefficient $p_{l,i,m}^{(2)}$ for the (DFT) vector in vector group $g^{(k)}$ indexed by $(x_1, x_2)$, where the three examples of maximum second amplitude coefficients are given in Table 3. Note that here the restriction on the maximum second amplitude coefficient is independent for each beam/vector comprising the k-th vector group. In one example, X is fixed, e.g. X=1 or 2 or 4. In another example, X is configured via higher layer RRC signaling, e.g., X is configured from either {2, 4} or {1, 2} or {1, 2, 4} or {1-8}. In a variation, when the amplitude restriction is according to Ex3 in Table 3, the CBSR scheme according to Alt 0-0-0 can be used (which uses $K_2=2N_1N_2$) except that either:

the UE is not expected to be configured with an amplitude value x that is 0<x<1, or the UE is not expected to be configured with $b_2^{(k,2(N_1x_2+x_1)+1)}b_2^{(k,2(N_1x_2x_1))}=$'01' or '10' in Table 2, or the UE interprets the amplitude values corresponding to $b_2^{(k,2(N_1x_2+x_1)+1)}b_2^{(k,2(N_1x_2x_1))}=$'01' or '10' as 0, or the UE interprets the amplitude values corresponding to $b_2^{(k,2(N_1x_2+x_1)+1)}b_2^{(k,2(N_1x_2x_1))}=$'01' or '10' as 1.

This variation of Alt 0-0-4 is proposed later in embodiment 0A.

In one alternative Alt 0-0-5: $K_2=N_1N_2$ and $b_2^{(k,N_1x_2+x_1)}$ indicate the only allowed (single value) second amplitude coefficient $p_{l,i,m}^{(2)}$ tor the (DFT) vector in vector group $g^{(k)}$ indexed by $(x_1, x_2)$, where the three examples of the only allowed (single value) second amplitude coefficients are given in Table 3. Note that here the restriction on the only allowed (single value) second amplitude coefficient is independent for each beam/vector comprising the k-th vector group. In one example, X is fixed, e.g. X=1 or 2 or 4. In another example, X is configured via higher layer RRC signaling, e.g., X is configured from either {2, 4} or {1, 2} or {1, 2, 4} or {1-8}.

TABLE 2

Maximum allowed amplitude coefficients for restricted vectors

| Bits $b_2^{(k,2(N_1x_2+x_1)+1)}b_2^{(k,2(N_1x_2+x_1))}$ | Ex1: Maximum Amplitude Coefficient $p_{l,i,m}^{(2)}$ | Ex2: Maximum Amplitude Coefficient $p_{l,i,m}^{(2)}$ |
|---|---|---|
| 00 | 0 | 0 |
| 01 | $\sqrt{1/4}$ | $\sqrt{1/16}$ = 1/4 |
| 10 | $\sqrt{1/2}$ | $\sqrt{1/4}$ = 1/2 |
| 11 | 1 | 1 |

TABLE 3

Allowed second amplitude coefficients for restricted vectors

| Bits $b_2^{(k,2(N_1x_2+x_1))}$ | Ex1: Second Amplitude Coefficient $p_{l,i,m}^{(2)}$ | Ex2: Second Amplitude Coefficient $p_{l,i,m}^{(2)}$ | Ex3: Second Amplitude Coefficient $p_{l,i,m}^{(2)}$ |
|---|---|---|---|
| 0 | 0 | $\sqrt{1/2^X}$ | 0 |
| 1 | $\sqrt{1/2^X}$ | 1 | 1 |

In one alternative Alt 0-1, the bit sequence $B_2^{(k)}$ restricts the second amplitude coefficient $p_{l,i,m}^{(2)}$ for the DFT beams/vectors comprising the vector group $G(r_1^{(k)},r_2^{(k)})$ indicated by $g^{(k)}$ via the bit sequence $B_1$, the details of which are according to Alt 0-0. There is an implicit restriction (without any explicit signaling or configuration) on the first amplitude coefficient $p_{l,i,m}^{(1)}$ also. For example, a restriction on the first amplitude coefficient $p_{l,i,m}^{(1)}$ can be obtained based on the maximum allowed second amplitude coefficients for the coefficients $c_{l,i,m}$ that are associated with the corresponding first amplitude coefficient. In one example, the maximum allowed first amplitude coefficient $p_{l,i,m}^{(1)}$ equals the maximum of all maximum allowed second amplitude coefficients for the coefficients $c_{l,i,m}$ that are associated with the corresponding first amplitude coefficient.

In one alternative Alt 0-2, the bit sequence $B_2^{(k)}$ restricts the amplitude coefficient $p_{l,i,m}=p_{l,i,m}^{(1)}p_{l,i,m}^{(2)}$ for the DFT beams/vectors comprising the vector group $G(r_1^{(k)}, r_2^{(k)})$ indicated by $g^{(k)}$ via the bit sequence $B_1$. The rest of the details are the same as in Alt 0-0 except that the second amplitude coefficient $p_{l,i,m}^{(2)}$ is replaced with the amplitude coefficient $p_{l,i,m}=p_{l,i,m}^{(1)}p_{l,i,m}^{(2)}$ throughout. In particular, the details about the maximum or a single allowed amplitude)) values now apply to the amplitude coefficient $p_{l,i,m}=p_{l,i,m}^{(1)}p_{l,i,m}^{(2)}$, instead of the second amplitude) coefficient $p_{l,i,m}^{(2)}$.

In one alternative Alt 0-3, the bit sequence $B_2^{(k)}$ restricts both the first amplitude) coefficient $p_{l,i,m}^{(1)}$ and the second amplitude coefficient $p_{l,i,m}^{(2)}$ for the DFT beams/vectors comprising the vector group $G(r_1^{(k)},r_2^{(k)})$ indicated by $g^{(k)}$ via the bit sequence $B_1$, where the restriction is common for both the first amplitude coefficient $p_{l,i,m}^{(1)}$ and the second amplitude coefficient $p_{l,i,m}^{(2)}$. The rest of the details are the same as in Alt 0-0, i.e., the details about the restriction on the second amplitude coefficient as in Alt 0-0 are applicable to both first and second amplitude coefficients.

In one alternative Alt 0-4, the bit sequence $B_2^{(k)}=B_{2,1}^{(k)}B_{2,2}^{(k)}=B_{2,2}^{(k)}B_{2,1}^{(k)}$ restricts both the first amplitude coefficient $p_{l,i,m}^{(1)}$ and the second amplitude coefficient $p_{l,i,m}^{(2)}$ for the DFT beams/vectors comprising the vector group $G(r_1^{(k)},r_2^{(k)})$ indicated by $g^{(k)}$ via the bit sequence $B_1$, where $B_{2,1}^{(k)}$ restricts the first amplitude coefficient $p_{l,i,m}^{(1)}$, where the bit sequence $B_{2,1}^{(k)}$ is defined In one example, $K_{2,1}=2$ and $b_{2,1}^{(k,1)}b_{2,1}^{(k,0)}$ indicates the maximum allowed first amplitude coefficient $p_{l,i,m}^{(1)}$ for all (DFT) vectors in vector group $g^{(k)}$, where two examples of the maximum first amplitude coefficients are given in Table 2. Note that here the restriction on the maximum first amplitude coefficient is common for all beams/vectors comprising the k-th vector group.

$B_{2,2}^{(k)}$ restricts the second amplitude coefficient according to at least one sub-alternatives/examples in Alt 0-0, hence $B_{2,2}^{(k)}$ is equivalent to $B_2^{(k)}$ used in Alt 0-0.

In one alternative Alt 0-5, the bit sequence $B_2=B_{2,1}B_{2,2}$ or $B_{2,2}B_{2,1}$, where $B_{2,1}$ is the bit sequence restricting the first amplitude coefficients for P vector groups, and $B_{2,2}=B_{2,2}^{(0)} B_{2,2}^{(1)} \ldots B_{2,2}^{(P-1)}$ is the concatenation of bit sequences restricting the second amplitude coefficients for P vector groups, where $B_{2,2}^{(k)}$ restricts the second amplitude coefficient according to at least one sub-alternatives/examples in Alt 0-0, hence $B_{2,2}^{(k)}$ is equivalent to $B_2^{(k)}$ used in Alt 0-0.

In one example, the bit sequence $B_{2,2}=B_{2,2}^{(0)} B_{2,2}^{(1)} \ldots B_{2,2}^{(P-1)}$ is the concatenation of bit sequences restricting the first amplitude coefficients for P vector groups, where restricts the first amplitude coefficient $p_{l,i,m}^{(1)}$, where the bit sequence $B_{2,1}^{(k)}$ is defined as $B_{2,1}^{(k)} = b_{2,1}^{(k,K_{2,1}-1)} \ldots b_{2,1}^{(k,0)}$.

In one example, $K_{2,1}=2$ and $b_{2,1}^{(k,1)} b_{2,1}^{(k,0)}$ indicates the maximum allowed first amplitude coefficient $p_{l,i,m}^{(2)}$ for all (DFT) vectors in vector group $g^{(k)}$, where two examples of the maximum first amplitude coefficients are given in Table 2. Note that here the restriction on the maximum first amplitude coefficient is common for all beams/vectors comprising the k-th vector group.

In one alternative Alt 0-6, the bit sequence $B_2^{(k)}$ restricts the wideband (WB) amplitude (or gain) for the SD DFT beams/vectors comprising the vector group $G(r_1^{(k)}, r_2^{(k)})$ indicated by $g^{(k)}$ via the bit sequence $B_1$. In one example, this restriction on WB amplitude/gain is applied based on of the $W_2 = \tilde{W}_2 W_f^H$ matrix (after reconstruction) as follows. For each SD beam $i_0$ in each of the P beam groups and FD index $k_0$, $0 \leq k_0 < N_3$, a wideband gain threshold $\Gamma_{i_0}$ is configured. The amplitude restriction on the WB amplitude/gain satisfies $$\frac{|w_2(i_0, k_0)|}{\max_{i,k}|w_2(i, k)|} \leq \Gamma_{i_0},$$

where $w_2(i_0, k_0)$ is the $(i_0, k_0)$-th element of the matrix $W_2 = \tilde{W}_2 W_f^H$. Note that this WB amplitude/gain restriction in the frequency domain of the pre-coder is restricted similarly to amplitude restriction in Type II CSI codebook. In one example, the threshold $\Gamma_{i_0}$ is configured from the set of values $$\left\{0, \frac{1}{\sqrt{2}}, \frac{1}{2}, 1\right\}.$$

In a variation (Alt 0-6A) of Alt 0-6, the restriction is applied as $$\frac{|w_2(i_0, k_0)|}{n} \leq \Gamma_{i_0},$$

where n is a normalization factor, and |x| denotes the amplitude of x.

In a variation (Alt 0-6B) of Alt 0-6, the restriction is applied as $|w_2(i_0, k_0)| \leq \Gamma_{i_0}$.

In a variation (Alt 0-6C) of Alt 0-6, the restriction is applied as $$\frac{|w_2(i_0, k_0)|}{\sqrt{\frac{1}{n}\sum_{i=0}^{2L-1}\sum_{k=0}^{N_3}|w_2(i,k)|^2}} \leq \Gamma_{i_0},$$

where $n=2LN_3$ is a normalization factor.

In one alternative Alt 0-7, the bit sequence $B_2^{(k)}$ restricts the sum power (or power ratio) for the SD DFT beams/vectors comprising the vector group $G(r_1^{(k)}, r_2^{(k)})$ indicated by $g^{(k)}$ via the bit sequence $B_1$. In one example, this restriction on the sum power is applied as follows. For each SD beam $i_0$ in each of the P beam groups, a power threshold $\gamma_{i_0}$ is configured. The sum power restriction satisfies:

$$\sum_{l=0}^{RI-1}\sum_{m=0}^{M-1}\sum_{k=0}^{1} p_{res,i_0}^2(l, m, k) \leq \gamma_{i_0},$$

where RI=v is the rank value, $p_{res,i_0}(l, m, 0)$ is the amplitude of coefficient $c_{l,i_0,m}$ (for one antenna polarization, i.e., k=0), and $p_{res,i_0}(l, m, 1)$ is the amplitude of coefficient $c_{l,i_0+L,m}$ (for other antenna polarization, i.e. k=1). In one example, the threshold $\gamma_{i_0}$ or the square-root of the threshold $\sqrt{\gamma_{i_0}}$ is configured from the set of values $$\left\{0, \frac{1}{2}, \frac{1}{\sqrt{2}}, 1\right\} \text{ or } \left\{0, \frac{1}{4}, \frac{1}{2}, 1\right\}$$

(via 2-bit indication as shown in Table 2). In one example, the normalized sum power (or power ratio) corresponds to average coefficient amplitude.

In a variation (Alt 0-7A) of Alt 0-7, the restriction is applied on the normalized sum power (or power ratio) as follows:

$$\frac{1}{n}\sum_{l=0}^{RI-1}\sum_{m=0}^{M-1}\sum_{k=0}^{1} p_{res,i_0}^2(l, m, k) \leq \gamma_{i_0},$$

where n is a normalization factor. In one example, n=2vM. In another example, n is the number of NZ coefficients associated with the SD beam $i_0$, i.e., $$n = \sum_{l=0}^{RI-1}\sum_{m=0}^{M-1}\sum_{k=0}^{1} x_{i_0}(l, m, k),$$

where $x_{i_0}(l, m, 0)=1$ if coefficient $c_{l,i_0,m}$ (for one antenna polarization, i.e., k=0) is NZ, and $x_{i_0}(l, m, 1)=0$ otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{l=0}^{RI-1}\sum_{m=0}^{M-1}(b_{l,i_0,m} + b_{l,i_0+L,m}) \text{ or}$$

$$\sum_{l=0}^{RI-1}\sum_{m=0}^{M-1}(b_{l,i_0,m} + b_{l,(i_0+L)\mathrm{mod}L,m}),$$

where $b_{l,i,m}$ is the value of the bit associated with coefficient $c_{l,i,m}$ that is reported by the UE via the bitmap to indicate whether coefficient $c_{l,i,m}$ is NZ or zero.

In another variation (Alt 0-7B) of Alt 0-7, the restriction is applied on the root-mean-square (RMS) or the squared-root of the sum power (or power ratio) as follows:

$$\sqrt{\sum_{l=0}^{Rl-1} \sum_{m=0}^{M-1} \sum_{k=0}^{1} p_{res,i_0}^2(l, m, k)} \leq \gamma_{i_0}.$$

In another variation (Alt 0-7C) of Alt 0-7, the restriction is applied on the normalized root-mean-square (RMS) or the squared-root of the sum power (or power ratio) as follows:

$$\sqrt{\frac{1}{n}\sum_{l=0}^{Rl-1} \sum_{m=0}^{M-1} \sum_{k=0}^{1} p_{res,i_0}^2(l, m, k)} \leq \gamma_{i_0},$$

where n is a normalization factor. In one example, n=2vM. In another example, n is the number of NZ coefficients associated with the SD beam $i_0$, i.e., $$n = \sum_{l=0}^{Rl-1} \sum_{m=0}^{M-1} \sum_{k=0}^{1} x_{i_0}(l, m, k),$$

where $x_{i_0}$ (l, m, 0)=1 if coefficient $c_{l,i_0,m}$ (for one antenna polarization, i.e., k=0) is NZ, and $x_{i_0}$ (l, m, 1)=0 otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{l=0}^{Rl-1} \sum_{m=0}^{M-1} (b_{l,i_0,m} + b_{l,i_0+L,m}) \text{ or}$$

$$\sum_{l=0}^{Rl-1} \sum_{m=0}^{M-1} (b_{l,i_0,m} + b_{l,(i_0+L)modL,m}),$$

where $b_{l,i,m}$ is the value of the bit associated with coefficient $c_{l,i,m}$ that is reported by the UE via the bitmap to indicate whether coefficient $c_{l,i,m}$ is NZ or zero.

In one alternative Alt 0-8, the bit sequence $B_2^{(k)}$ restricts the sum of coefficient power over FD components for the SD DFT beams/vectors comprising the vector group $G(r_1^{(k)}, r_2^{(k)})$ indicated by $g^{(k)}$ via the bit sequence $B_1$. In one example, this restriction on the sum of coefficient power over FD components is applied as follows. For each SD beam $i_0$ in each of the P beam groups, a power threshold $\gamma_{i_0}$ is configured (this configuration is common for two polarizations k=0,1 and all layers l=0, 1, . . . , v−1). The restriction satisfies:

$$\sum_{m=0}^{M-1} p_{res,i_0}^2(l, m, k) \leq \gamma_{i_0},$$

where $p_{res,i_0}$(l, m, 0) is the amplitude of coefficient $c_{l,i_0,m}$ (for one antenna polarization, i.e., k=0), and $p_{res,i_0}$ (l, m, 1) is the amplitude of coefficient $c_{l,i_0+L,m}$ (for other antenna polarization, i.e. k=1). This restriction applies to both polarizations k=0, 1 and all layers l=0, 1, . . . , v−1. In one example, the threshold $\gamma_{i_0}$ or the square-root of the threshold $\sqrt{\gamma_{i_0}}$ is configured from the set of values $$\left\{0, \frac{1}{2}, \frac{1}{\sqrt{2}}, 1\right\} \text{ or } \left\{0, \frac{1}{4}, \frac{1}{2}, 1\right\}$$

(via 2-bit indication as shown in Table 2). In one example, the normalized sum power (or power ratio) corresponds to average coefficient amplitude. Note that Alt 0-6 and Alt 0-8/8A/8B/8C are similar since both restricts the sum of amplitude power over FD components.

In a variation (Alt 0-8A) of Alt 0-8, the restriction is applied on the normalized sum power as follows:

$$\frac{1}{n}\sum_{m=0}^{M-1} p_{res,i_0}^2(l, m, k) \leq \gamma_{i_0}$$

for each (l, k, $i_0$), where n is a normalization factor. In one example, n=M. In another example, n=$K_{NZ}$(l, k, $i_0$) is the number of NZ coefficients associated with (l, k, $i_0$), i.e., $$n = \sum_{m=0}^{M-1} x_{i_0}(l, m, k),$$

where $x_{i_0}$ (l, m, 0)=1 if coefficient $c_{l,i_0,m}$ (for one antenna polarization, i.e., k=0) is NZ, and $x_{i_0}$ (l, m, 1)=0 otherwise, i.e., if coefficient $c_{l,i_0+L,m}$ (for other antenna polarization, i.e. k=1) is zero. In another example, n is the number of NZ coefficients associated with the SD beam $i_0$, i.e., $$\sum_{m=0}^{M-1} b_{l,i_0,m},$$

where $b_{l,i_0,m}$ is the value of the bit associated with coefficient $c_{l,i_0,m}$ that is reported by the UE via the bitmap to indicate whether coefficient $c_{l,i_0,m}$ is NZ or zero. An equivalent expression including the bitmap is given by $$\frac{1}{\sum_{m=0}^{M-1} b_{l,i_0,m}}\sum_{m=0}^{M-1} b_{l,i_0,m} p_{res,i_0}^2(l, m, k) \leq \gamma_{i_0},$$

where $p_{res,i_0}$ (l, m, k)=$p_{l,k}^{(1)} p_{l,i_0,m}^{(2)}$ the amplitude of coefficient $c_{l,i_0,m}$.

In another variation (Alt 0-8B) of Alt 0-8, the restriction is applied on the root-mean-square (RMS) or the squared-root of the sum power as follows $$\sqrt{\sum_{m=0}^{M-1} p_{res,i_0}^2(l, m, k)} \leq \gamma_{i_0}.$$

In another variation (Alt 0-8C) of Alt 0-8, the restriction is applied on the normalized root-mean-square (RMS) or the squared-root of the sum power as follows:

$$\sqrt{\frac{1}{n}\sum_{m=0}^{M-1} p_{res,i_0}^2(l,m,k)} \leq \gamma_{i_0}$$

for each (l, k, $i_0$), where n is a normalization factor. In one example, n=M. In another example, n=$K_{NZ}$(l, k, $i_0$) is the number of NZ coefficients associated with (l, k, $i_0$), i.e., $$n = \sum_{m=0}^{M-1} x_{i_0}(l,m,k),$$

where $x_{i_0}$ (l, m, 0)=1 if coefficient $c_{l,i_0,m}$ (for one antenna polarization, i.e., k=0) is NZ, and $x_{i_0}$ (l, m, 1)=0 otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{m=0}^{M-1} b_{l,i_0,m},$$

where $b_{l,i_0,m}$ is the value of the bit associated with coefficient $c_{l,i_0,m}$ that is reported by the UE via the bitmap to indicate whether coefficient $c_{l,i_0,m}$ is NZ or zero. An equivalent expression including the bitmap is given by $$\sqrt{\frac{1}{\sum_{m=0}^{M-1} b_{l,i_0,m}} \sum_{m=0}^{M-1} b_{l,i_0,m} p_{res,i_0}^2(l,m,k)} \leq \gamma_{i_0},$$

where $p_{res,i_0}$ (l, m, k)=$p_{l,k}^{(1)} p_{l,i_0,m}^{(2)}$ is the amplitude of coefficient $c_{l,i_0,m}$.

In one alternative Alt 0-9, the bit sequence $B_2^{(k)}$ restricts the sum of coefficient power over FD components and antenna polarizations for the SD DFT beams/vectors comprising the vector group G($r_1^{(k)}$, $r_2^{(k)}$) indicated by $g^{(k)}$ via the bit sequence $B_1$. In one example, this restriction on the sum of coefficient power over FD components and polarizations is applied as follows. For each SD beam $i_0$ in each of the P beam groups, a power threshold $\gamma_{i_0}$ is configured (this configuration is common all layers l=0, 1, . . . , v−1). The restriction satisfies:

$$\sum_{m=0}^{M-1} \sum_{k=0}^{1} p_{res,i_0}^2(l,m,k) \leq \gamma_{i_0},$$

where $p_{res,i_0}$ (l, m, 0) is the amplitude of coefficient $c_{l,i_0,m}$ (for one antenna polarization, i.e., k=0), and $p_{res,i_0}$ (l, m, 1) is the amplitude of coefficient $c_{l,i_0,m}$ (for other antenna polarization, i.e. k=1). This restriction applies to all layers l=0, 1, . . . , v−1. In one example, the threshold $\gamma_{i_0}$ or the square-root of the threshold $\sqrt{\gamma_{i_0}}$ is configured from the set of values $$\left\{0, \frac{1}{2}, \frac{1}{\sqrt{2}}, 1\right\} \text{ or } \left\{0, \frac{1}{4}, \frac{1}{2}, 1\right\}$$

(via 2-bit indication as shown in Table 2). In one example, the normalized sum power (or power ratio) corresponds to average coefficient amplitude.

In a variation (Alt 0-9A) of Alt 0-9, the restriction is applied on the normalized sum power as follows:

$$\frac{1}{n}\sum_{m=0}^{M-1}\sum_{k=0}^{1} p_{res,i_0}^2(l,m,k) \leq \gamma_{i_0},$$

a normalization factor. In one example, n=2M. In another example, n is the number of NZ coefficients associated with the SD beam i i.e., $$n = \sum_{m=0}^{M-1}\sum_{k=0}^{1} x_{i_0}(l,m,k),$$

where $x_{i_0}$ (l, m, 0)=1 if coefficient $c_{l,i_0,m}$ (for one antenna polarization, i.e., k=0) is NZ, and $x_{i_0}$(l, m, 1)=0 otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{m=0}^{M-1} (b_{l,i_0,m} + b_{l,i_0+L,m}) \text{ or}$$

$$\sum_{m=0}^{M-1} (b_{l,i_0,m} + b_{l,(i_0+L)\mod L,m}),$$

where $b_{l,i,m}$ is the value of the bit associated with coefficient that is reported by the UE via the bitmap to indicate whether coefficient $c_{l,i,m}$ is NZ or zero.

In another variation (Alt 0-9B) of Alt 0-9, the restriction is applied on the root-mean-square (RMS) or the squared-root of the sum power as follows:

$$\sqrt{\sum_{m=0}^{M-1}\sum_{k=0}^{1} p_{res,i_0}^2(l,m,k)} \leq \gamma_{i_0}.$$

In another variation (Alt 0-9C) of Alt 0-9, the restriction is applied on the normalized root-mean-square (RMS) or the squared-root of the sum power as follows:

$$\sqrt{\frac{1}{n}\sum_{m=0}^{M-1}\sum_{k=0}^{1} p_{res,i_0}^2(l,m,k)} \leq \gamma_{i_0},$$

where n is a normalization factor. In one example, n=2M. In another example, n is the number of NZ coefficients associated with the SD beam $i_0$, i.e., $$n = \sum_{m=0}^{M-1}\sum_{k=0}^{1} x_{i_0}(l,m,k),$$

where $x_{i_0}(l, m, 0)=1$ if coefficient $c_{l,i_0+L,m}$ (for one antenna polarization, i.e., k=0) is NZ, and $x_{i_0}(l, m, 1)=0$ otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{m=0}^{M-1} (b_{l,i_0,m} + b_{l,i_0+L,m}) \text{ or } \sum_{m=0}^{M-1} (b_{l,i_0,m} + b_{l,(i_0+L)\bmod L,m}),$$

where $b_{l,i,m}$ is the value of the bit associated with coefficient $c_{l,i,m}$ that is reported by the UE via the bitmap to indicate whether coefficient $c_{l,i,m}$ is NZ or zero.

In one alternative Alt 0-10, the bit sequence $B_2^{(k)}$ restricts the sum of coefficient power over FD components and layers for the SD DFT beams/vectors comprising the vector group $G(r_1^{(k)}, r_2^{(k)})$ indicated by $g^{(k)}$ via the bit sequence $B_1$. In one example, this restriction on the sum of coefficient power over FD components and layers is applied as follows. For each SD beam $i_0$ in each of the P beam groups, a power threshold $\gamma_{i_0}$ is configured (this configuration is common two polarizations k=0,1). The restriction satisfies:

$$\sum_{l=0}^{RI-1} \sum_{m=0}^{M-1} p_{res,i_0}^2(l, m, k) \leq \gamma_{i_0},$$

where $p_{res,i_0}(l, m, 0)$ is the amplitude of coefficient $c_{l,i_0}$ (for one antenna polarization, i.e., k=0), and $p_{res,i_0}(l, m, 1)$ is the amplitude of coefficient $c_{l,i_0+L,m}$ (for other antenna polarization, i.e. k=1). This restriction applies to both polarizations k=0,1. In one example, the threshold $\gamma_{i_0}$ or the square-root of the threshold $\sqrt{\gamma_{i_0}}$ is configured from the set of values $$\left\{0, \frac{1}{2}, \frac{1}{\sqrt{2}}, 1\right\} \text{ or } \left\{0, \frac{1}{4}, \frac{1}{2}, 1\right\}$$

(via 2-bit indication as shown in Table 2). In one example, the normalized sum power (or power ratio) corresponds to average coefficient amplitude.

In a variation (Alt 0-10A) of Alt 0-10, the restriction is applied on the normalized sum power as follows:

$$\frac{1}{n} \sum_{l=0}^{RI-1} \sum_{m=0}^{M-1} p_{res,i_0}^2(l, m, k) \leq \gamma_{i_0},$$

where n is a normalization factor. In one example, n=vM. In another example, n is the number of NZ coefficients associated with the SD beam $i_0$, i.e., $$n = \sum_{l=0}^{RI-1} \sum_{m=0}^{M-1} x_{i_0}(l, m, k),$$

where $x_{i_0}(l, m, 1)=1$ if coefficient $c_{l,i_0,m}$ (for one antenna polarization, i.e., k=0) is NZ, and $x_{i_0}(l, m, 1)=0$ otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{l=0}^{RI-1} \sum_{m=0}^{M-1} b_{l,i_0,m},$$

where $b_{l,i,m}$ is the value of the bit associated with coefficient that is reported by the UE via the bitmap to indicate whether coefficient is NZ or zero.

In another variation (Alt 0-10B) of Alt 0-10, the restriction is applied on the root-mean-square (RMS) or the squared-root of the sum power as follows:

$$\sqrt{\sum_{l=0}^{RI-1} \sum_{m=0}^{M-1} p_{res,i_0}^2(l, m, k)} \leq \gamma_{i_0}.$$

In another variation (Alt 0-10C) of Alt 0-10, the restriction is applied on the normalized root-mean-square (RMS) or the squared-root of the sum power as follows:

$$\sqrt{\frac{1}{n} \sum_{l=0}^{RI-1} \sum_{m=0}^{M-1} p_{res,i_0}^2(l, m, k)} \leq \gamma_{i_0},$$

where n is a normalization factor. In one example, n=vM. In another example, n is the number of NZ coefficients associated with the SD beam $i_0$, i.e., $$n = \sum_{l=0}^{RI-1} \sum_{m=0}^{M-1} x_{i_0}(l, m, k),$$

where $x_{i_0}(l, m, 0)=1$ if coefficient $c_{l,i_0+L,m}$ (for one antenna polarization, i.e., k=0) is NZ, and $x_{i_0}(l, m, 1)=0$ otherwise, i.e., if coefficient $c_{l,i_0+L,m}$ (for other antenna polarization, i.e. k=1) is zero. In another example, n is the number of NZ coefficients associated with the SD beam $i_0$, i.e., $$n = \sum_{l=0}^{RI-1} \sum_{m=0}^{M-1} b_{l,i_0,m},$$

where $b_{l,i,m}$ is the value of the bit associated with coefficient $c_{l,i,m}$ that is reported by the UE via the bitmap to indicate whether coefficient $c_{l,i,m}$ is NZ or zero.

In one example, the coefficient $$c_{l,i,m} = p_{ref,i}\left(\left\lfloor \frac{i}{L} \right\rfloor\right) \times p_{l,i,m}^{(2)} \times \varphi_{l,i,m},$$

where $$p_{l,i,m}^{(1)} = p_{ref,i}\left(\left\lfloor \frac{i}{L} \right\rfloor\right)$$

is the polarization-specific reference amplitude component, $p_{l,i,m}^{(2)}$ is the differential amplitude component, and $\varphi_{l,i,m}$ is the phase.

In Alt 0-6 through Alt 0-10 (including their variations A, B, and C), the SD beam $i_0 \in \{0, 1, \ldots, 2L-1\}$. Or, the SD beam $i_0 = i + kL$ where $k \in \{0, 1\}$ is antenna polarization index and $i \in \{0, 1, \ldots, L-1\}$ is SD basis vector index which is common for the two antenna polarizations.

In a variation, the bitmap (or bit sequence) B includes a bit sequence $B_{ph}$ to indicate/restrict the allowed values of the phase coefficients $\phi_{l,i,m}$ for the P vector groups. The amplitude coefficient restriction is according to one of the above alternatives. At least one of the following alternatives is used for phase restriction.

In one alternative Alt 0-a: the bit sequence $B_{ph} = b_{ph}^{(K_{ph}-1)} \ldots b_{ph}^{(0)}$, where $K_{ph}$ is the length of the bit sequence, $b_{ph}^{(K_{ph}-1)}$ is the MSB and $b_{ph}^{(0)}$ is the LSB. The phase restriction is common for all P vector groups.

In one alternative Alt 0-b: the bit sequence $B_{ph} = B_{ph}^{(0)} \ldots B_{ph}^{(P-1)}$ is the concatenation of P bit sequences, where the bit sequence $B_{ph}^{(k)} = b_{ph}^{(k,K_{ph}-1)} \ldots b_{ph}^{(k,0)}$, where $K_{ph}$ is the length of the bit sequence, $b_{ph}^{(k,K_{ph}-1)}$ is the MSB and $b_{ph}^{(k,0)}$ is the LSB. The bit sequence $B_{ph}^{(k)}$ indicates/restricts the allowed values of the phase coefficients $\phi_{l,i,m}$ for the k-th vector group.

In one example, $K_{ph} = 1$ and 1-bit indication ($b_{ph}^{(0)}$ or $b_{ph}^{(k,0)}$) is used to indicate the phase restriction. For example, when $b_{ph}^{(0)}$ or $b_{ph}^{(k,0)}$ equals 1, then the allowed values of the phase coefficients $\phi_{l,i,m}$ for the P vector groups corresponds to a $N_{PSK}$-PSK alphabet and when $b_{ph}^{(0)}$ or $b_{ph}^{(k,0)}$ equals 0, then the allowed values of the phase coefficients $\phi_{l,i,m}$ for the P vector groups is restricted to a $(N_{PSK}-1)$-PSK alphabet, where $N_{PSK}$ is configured from $\{4,8\}$ or $\{8,16\}$, and the $N_{PSK}$-PSK alphabet is given by $$\{e^{j2\pi p_{l,i,m}/N_{PSK}} : p_{l,i,m} = 0, 1, \ldots, N_{PSK} - 1\}.$$

When at least one of SD vectors/vector groups, amplitude (first, second, or both) coefficients, and phase coefficients are restricted according to at least one of the above-mentioned alternatives, then the payload (number of bits) to report them can be adapted (or reduced). Alternatively, the payload is not adapted (hence remains the same) regardless of whether CBSR is applied or not.

In embodiment 0A, a UE is configured with CBSR via higher layer (e.g. RRC) signaling, wherein the CBSR restricts only SD beams or vectors $v_{l,m}$, and there is no restriction on FD beams or vectors $w_k$. The details of the CBSR is according to Alt 0-2 with sub-alternative Alt 0-0-4 and Ex 3 in Table 3. This CBSR scheme is a basic CBSR scheme, "Mandatory" (sub-) feature for a Rel. 16 UE, which implies that a Rel. 16 UE has to support this CBSR scheme when it is capable of Type II CSI reporting according to the Rel. 16 Type II CSI codebook.

In addition, another CBSR scheme according to Alt X of this disclosure is also supported for an advanced Rel. 16 UE. This CBSR scheme is an advanced CBSR scheme, "Optional" for a Rel. 16 UE, which implies that a separate UE (sub-)capability is needed (hence not necessarily supported) even when the UE is capable of Type II CSI reporting according to the Rel. 16 Type II CSI codebook. In one example, Alt X is according to at least one of Alt 0-8A or Alt 0-8C. The signaling related to this (sub-)capability can be reported by the UE using the information element (IE) CodebookParameters used to convey codebook related parameters in UE capability information elements via RRC message. Either amplitudeSubsetRestriction in existing type2 field or amplitudeSubsetRestriction in a new type2-r16 field is used for this purpose, both are shown in yellow highlighted text below. The IE amplitudeSubsetRestriction indicates whether amplitude subset restriction according to the advanced CBSR scheme is supported for the UE.

| CodebookParameters information element |
| --- |
| -- ASN1START |
| -- TAG-CODEBOOKPARAMETERS-START |
| CodebookParameters::=         SEQUENCE { |
|   type1        SEQUENCE { |
|     ... |
|   }, |
|   type2        SEQUENCE { |
|     ... |
|     amplitudeSubsetRestriction    ENUMERATED |
|       {supported}      OPTIONAL |
|   } OPTIONAL, |
|   type2-PortSelection    SEQUENCE { |
|     ... |
|   } OPTIONAL |
|   type2-r16      SEQUENCE { |
|     ... |
|     amplitudeSubsetRestriction    ENUMERATED |
|       {supported}      OPTIONAL |
|   } OPTIONAL |
| } |
| ... |
| } |
| -- TAG-CODEBOOKPARAMETERS-STOP |
| -- ASN1STOP |

In a variation of this embodiment, for a UE capable of the advanced CB SR scheme, the advanced CBSR scheme is always used. For a UE not capable of the advanced CBSR scheme, the basis CBSR scheme is always used.

In another variation of this embodiment, for a UE capable of the advanced CBSR scheme, the UE can be configured (e.g. via higher layer RRC signaling either via a new RRC parameter for CBSR or via an existing RRC parameter for CBSR) with either the basis CBSR scheme or the advanced CBSR scheme. For a UE not capable of the advanced CBSR scheme, the basis CBSR scheme is always used.

For the basis CBSR scheme (when amplitudeSubsetRestriction is turned OFF or not reported by the UE), the bit sequence $B_2^{(k)}$ is defined as a $N_1 N_2$ bit sequence $$B_2^{(k)} = b_2^{(k,N_1N_2-1)} \ldots b_2^{(k,0)}.$$

The bit $b_2^{(k,N_1x_2+x_1)}$ indicates the maximum allowed amplitude coefficient $p_{l,i,m}$ for the vector in group $g^{(k)}$ indexed by $x_1, x_2$, where the maximum amplitude coefficients is 0 or 1, i.e., Ex 3 in Table 3. The total length of the bit sequence $B_2 = P \times N_1 N_2 = 4 N_1 N_2$. So, the total length of bits (in bit sequence B) for codebook subset restriction is $$\left\lceil \log_2 \binom{O_1 O_2}{4} \right\rceil + 4 N_1 N_2,$$

i.e., CEIL(log 2(nchoosek(O1*O2,4)))+4*n1*n2 where nchoosek(a,b)=a!/(b!(a−b)!).

For the advanced CBSR scheme (when amplitudeSubsetRestriction is turned ON or reported by the UE), the bit sequence $B_2^{(k)}$ is defined as a $2N_1 N_2$ bit sequence $$B_2^{(k)} = b_2^{(k,2N_1N_2-1)} \ldots b_2^{(k,0)}.$$

Bits $b_2^{(k,2(N_1x_2+x_1)+1)} b_2^{(k,2(N_1x_2+x_1))}$ indicate the maximum allowed amplitude coefficient $p_{l,i,m}$ for the vector in group $g^{(k)}$ indexed by $x_1,x_2$, where the maximum amplitude coefficients are given in Table 1 or Table 2. The total length of the bit sequence $B_2 = P \times 2N_1N_2 = 8N_1N_2$. So, the total length of bits (in bit sequence B) for codebook subset restriction is $$\left\lceil \log_2 \binom{O_1O_2}{4} \right\rceil + 8N_1N_2,$$

i.e., CEIL(log 2(nchoosek(O1*O2,4)))+8*n1*n2 where nchoosek(a,b)=a!/(b!(a−b)!).

Alternatively, for both basic and advanced CBSR schemes, the bit sequence $B_2^{(k)}$ is defined as a $2N_1N_2$ bit sequence $$B_2^{(k)} = b_2^{(k,2N_1N_2-1)} \ldots b_2^{(k,0)}.$$

Bits $b_2^{(k,2(N_1x_2+x_1)+1)}b_2^{(k,2(N_1x_2+x_1))}$ indicate the maximum allowed amplitude coefficient $p_{l,i,m}$ for the vector in group $g^{(k)}$ indexed by $x_1,x_2$, where the maximum amplitude coefficients are given in Table 1 or Table 2. The total length of the bit sequence $B_2 = P \times 2N_1N_2 = 8N_1N_2$. So, the total length of bits (in bit sequence B) for codebook subset restriction is $$\left\lceil \log_2 \binom{O_1O_2}{4} \right\rceil + 8N_1N_2,$$

i.e., CEIL(log 2(nchoosek(O1*O2,4)))+8*n1*n2 where nchoosek(a,b)=a!/(b!(a−b)!). When the UE does not report parameter amplitudeSubsetRestriction='supported' in its capability signaling, i.e., the UE is not capable of the advanced CBSR scheme (or the UE is capable of the basis CBSR scheme only), then at least one of the solutions is used.

The UE is not expected to be configured with an amplitude value x that is 0<x<1.

The UE is not expected to be configured with $b_2^{(k,2(N_1x_2+x_1)+1)}b_2^{(k,2(N_1x_2+x_1))}$='01' or '10' in Table 2.

The UE interprets the amplitude values corresponding to $b_2^{(k,2(N_1x_2+x_1)+1)}b_2^{(k,2(N_1x_2+x_1))}$='01' or '10' as 0.

The UE interprets the amplitude values corresponding to $b_2^{(k,2(N_1x_2+x_1)+1)}b_2^{(k,2(N_1x_2+x_1))}$='01' or '10' as 1.

Alternatively, the bit sequence $B_2^{(k)}$ is defined as a $qN_1N_2$ bit sequence $B_2^{(k)} = b_2^{(k,qN_1N_2-1)} \ldots b_2^{(k,0)}$. Here, q=1 for the basis CBSR scheme and q=2 for the advanced CBSR scheme. Bits $b_2^{(k,q(N_1x_2+x_1)+q-1)}b_2^{(k,q(N_1x_2+x_1))}$ indicate the maximum allowed amplitude coefficient $p_{l,i,m}$ for the vector in group $g^{(k)}$ indexed by $x_1,x_2$.

Alternatively, the bit sequence $B_2^{(k)}$ is defined as a $(q+1)N_1N_2$ bit sequence $B_2^{(k)} = b_2^{(k,(q+1)N_1N_2-1)} \ldots b_2^{(k,0)}$. Here, q=0 for the basis CBSR scheme and q=1 for the advanced CBSR scheme. Bits $b_2^{(k,q(N_1x_2+x_1)+q-1)}b_2^{(k,q(N_1x_2+x_1))}$ indicate the maximum allowed amplitude coefficient $p_{l,i,m}$ for the vector in group $g^{(k)}$ indexed by $x_1,x_2$.

Either n1-n2-codebookSubsetRestriction in an existing type2 field or n1-n2-codebookSubsetRestriction-r16 in a new type2-r16 field is used to configure CBSR, both are shown below. The IE n1-n2-codebookSubsetRestriction or n1-n2-codebookSubsetRestriction-r16 is used to determine the number of antenna ports in first (n1) and second (n2) dimension and the codebook subset restriction according to the advanced CBSR scheme.

| CodebookConfig information element |  |
|---|---|
| -- ASN1START |  |
| -- TAG-CODEBOOKCONFIG-START |  |
| CodebookConfig::= | SEQUENCE { |
|   codebookType | CHOICE { |
|     type1 | SEQUENCE { |
|       ... |  |
|     } |  |
|     type2 | SEQUENCE { |
|       subType | CHOICE { |
|         typeII | SEQUENCE { |
|           n1-n2-codebookSubsetRestriction | CHOICE { |
|             two-one | BIT STRING (SIZE (16)), |
|             two-two | BIT STRING (SIZE (43)), |
|             four-one | BIT STRING (SIZE (32)), |
|             three-two | BIT STRING (SIZE (59)), |
|             six-one | BIT STRING (SIZE (48)), |
|             four-two | BIT STRING (SIZE (75)), |
|             eight-one | BIT STRING (SIZE (64)), |
|             four-three | BIT STRING (SIZE (107)), |
|             six-two | BIT STRING (SIZE (107)), |
|             twelve-one | BIT STRING (SIZE (96)), |
|             four-four | BIT STRING (SIZE (139)), |
|             eight-two | BIT STRING (SIZE (139)), |
|             sixteen-one | BIT STRING (SIZE (128)) |
|           }, |  |
|           typeII-RI-Restriction | BIT STRING (SIZE (2)) |
|         }, |  |
|         typeII-PortSelection | SEQUENCE { |
|           ... |  |
|       }, |  |
|       numberOfBeams | ENUMERATED {two, three, four} |
|     }, |  |
|     type2-r16 | SEQUENCE { |
|       subType | CHOICE { |
|         typeII-r16 | SEQUENCE { |

| CodebookConfig information element | |
|---|---|
| n1-n2-codebookSubsetRestriction-r16 | CHOICE { |
| two-one | BIT STRING (SIZE (16)), |
| two-two | BIT STRING (SIZE (43)), |
| four-one | BIT STRING (SIZE (32)), |
| three-two | BIT STRING (SIZE (59)), |
| six-one | BIT STRING (SIZE (48)), |
| four-two | BIT STRING (SIZE (75)), |
| eight-one | BIT STRING (SIZE (64)), |
| four-three | BIT STRING (SIZE (107)), |
| six-two | BIT STRING (SIZE (107)), |
| twelve-one | BIT STRING (SIZE (96)), |
| four-four | BIT STRING (SIZE (139)), |
| eight-two | BIT STRING (SIZE (139)), |
| sixteen-one | BIT STRING (SIZE (128)) |
| }, | |
| typeII-RI-Restriction-r16 | BIT STRING (SIZE (4)) |
| }, | |
| typeII-PortSelection-r16 | SEQUENCE { ... |
| }, | |
| numberOfBeams | ENUMERATED {two, four, six} |
| } | |
| } | |
| } | |
| -- TAG-CODEBOOKCONFIG-STOP | |
| -- ASN1STOP | |

The above CBSR configuration can be common regardless of whether of the CBSR scheme, basic or advanced. Alternatively, the above CBSR configuration is only for the advanced CBSR scheme. For the basis CBSR scheme, the following IE field is used.

| CodebookConfig information element | |
|---|---|
| -- ASN1START | |
| -- TAG-CODEBOOKCONFIG-START | |
| CodebookConfig ::= | SEQUENCE { |
| codebookType | CHOICE { |
| type1 | SEQUENCE { ... |
| }, | |
| type2 | SEQUENCE { |
| subType | CHOICE { |
| typeII | SEQUENCE { ... |
| }, | |
| typeII-PortSelection | SEQUENCE { ... |
| }, | |
| numberOfBeams | ENUMERATED {two, three, four} |
| }, | |
| type2-r16 | SEQUENCE { |
| subType | CHOICE { |
| typeII-r16 | SEQUENCE { |
| n1-n2-codebookSubsetRestriction-r16 | CHOICE { |
| two-one | BIT STRING (SIZE (8)), |
| two-two | BIT STRING (SIZE (27)), |
| four-one | BIT STRING (SIZE (16)), |
| three-two | BIT STRING (SIZE (35)), |
| six-one | BIT STRING (SIZE (24)), |
| four-two | BIT STRING (SIZE (43)), |
| eight-one | BIT STRING (SIZE (32)), |
| four-three | BIT STRING (SIZE (59)), |
| six-two | BIT STRING (SIZE (59)), |
| twelve-one | BIT STRING (SIZE (48)), |

| CodebookConfig information element | |
|---|---|
| four-four | BIT STRING (SIZE (75)), |
| eight-two | BIT STRING (SIZE (75)), |
| sixteen-one | BIT STRING (SIZE (64)) |
| }, | |
| typeII-RI-Restriction-r16 | BIT STRING (SIZE (4)) |
| }, | |
| typeII-PortSelection-r16 | SEQUENCE { |
| ... | |
| }, | |
| numberOfBeams | ENUMERATED {two, four, six} |
| } | |
| } | |
| } | |

```
-- TAG-CODEBOOKCONFIG-STOP
-- ASN1STOP
```

In embodiment 1, a UE is configured with CBSR via higher layer (e.g., RRC) signaling, wherein the CBSR restricts both SD beams or vectors $v_{l,m}$, and FD beams or vectors $w_k$ where this restriction is separate (e.g. via two different bit sequences). In particular, $N_1O_1$ SD DFT beams for one-dimensional (1D) antenna port layouts (when $N_2=1$) or $N_1N_2O_1O_2$ SD DFT beams for two-dimensional (2D) antenna port layouts (when $N_2>1$) are partitioned into vector groups (or DFT beam groups) $G(r_1,r_2)$, where (r1, r2) is a SD vector group indicator. Likewise, $N_3O_3$ FD DFT beams are partitioned into vector groups (or DFT beam groups) $H(r_3)$, where r3 is a FD vector group indicator. The UE is configured with CBSR via higher layer (e.g. RRC) signaling of a bitmap (or bit sequence) $B=B_1B_2B_3$ or $B_2B_1B_3$ or $B_1B_3B_2$ or $B_2B_3B_1$ or $B_3B_1B_2$ or $B_3B_2B_1$, where the first part of the bitmap (or bit sequence) $B_1$ indicates P SD vector groups $G(r_1, r_2)$ that are restricted, and the second part of the bitmap (or bit sequence) $B_2$ is the concatenation of P bitmaps $B_2^{(k)}$ (for k=0, 1, ..., P−1 which indicate the restriction on the P SD vector groups $G(r_1, r_2)$. The first and second bit sequences are according to embodiment 0 (or at least one example or alternative therein). The third part of the bitmap (or bit sequence) $B_3$ is according to at least one of the following alternatives (Alt).

In one alternative Alt 1-0, the third part of the bitmap (or bit sequence) $B_3=b_3^{(K_3-1)}b_3^{(K_3-2)} \ldots b_3^{(0)}$ has a fixed length $K_3$, where $b_3^{(K_3-1)}$ is the most significant bit (MSB) and $b_3^{(0)}$ is the least significant bit (LSB), and restricts Q FD vector groups $H(r_3)$. In one example, a FD vector group is defined as follows.

$r_3$ indicates a FD vector group $H(r_3)$ comprising $N_3$ adjacent or non-orthogonal FD DFT beams $\{w_{N_3r_3+x_3}: x_3=0, 1, \ldots, N_3-1\}$. The range of values for $r_3$ is $\{0, 1, \ldots, O_3-1\}$. The bitmap $B_3$ restricts the values for vector group indicator $r_3$ and hence $K_3=O_3$.

The UE may be configured with restrictions for Q FD vector groups indicated by $r_3^{(x)}$ for x=0, 1, ..., Q−1. The remaining FD vector groups are not restricted. The value Q is either fixed (e.g. Q=1) or configured via higher layer RRC or more dynamic MAC CE based or (UL-related or DL-related) DCI signaling. In one example, when Q is fixed, the number of restricted FD vector groups is fixed, hence instead of length $K_3=O_3$, the length of the bitmap $B_3$ can be reduced to $$K_3 = \left\lceil \log_2 \binom{O_3}{Q} \right\rceil \text{bits}.$$

In this alternative, when Q=1 the length is $K_3=2$ bits, hence $B_3=b_3^{(1)}b_3^{(0)}$ is the two bit binary representation of the integer $\beta_3$. Note that $$\beta_3 \in \left\{0, 1, \ldots, \binom{O_3}{Q} - 1 \right\} = \{0, 1, 2, 3\}$$

for O3=4, and Q=1, hence requires 2 bits for binary representation. The group indices or indicators $r_3^{(x)}$ for x=0, 1, ..., Q−1 are as explained above.

In one example, this restriction on FD vector groups is independent of the restriction on the SD vectors/vector groups (as in embodiment 0); hence, the restriction on FD vector groups applies regardless whether of any restriction on SD vectors/vector groups. In another example, this restriction on FD vector groups is applicable together with the restriction on SD vectors/vector groups; hence, the restriction on FD vector groups applies only when the corresponding SD vectors/vector groups (when together used for PMI reporting) is also restricted. For instance, the restriction on FD vector groups applies only to SD vectors comprising the P SD vector groups that are restricted (embodiment 0).

In one alternative Alt 1-1, the third part of the bitmap (or bit sequence) is the concatenation of P bit sequences $B_3=B_3^{(0)}B_3^{(1)} \ldots B_3^{(P-1)}$, where the k-th bit sequence $B_3^{(k)}=b_3^{(k,K_3-1)}b_3^{(k,K_3-2)} \ldots b_3^{(k,0)}$ restricts Q FD vector groups H ($r_3$) corresponding to the k-th SD vector group restricted via the bitmap $B_1$. The UE may be configured with restrictions for Q FD vector groups indicated by $r_3^{(x)}$ for x=0, 1, ..., Q−1. The remaining FD vector groups are not restricted. The value Q is either fixed (e.g. Q=1) or configured via higher layer RRC or more dynamic MAC CE based or (UL-related or DL-related) DCI signaling. In one example, when Q is fixed, the number of restricted FD vector groups is fixed, hence instead of length $K_3=O_3$, the length of the bitmap $B_3^{(k)}$ can be reduced to $$K_3 = \left\lceil \log_2 \binom{O_3}{Q} \right\rceil \text{bits}.$$

In this alternative, when Q=1
the length is $K_3=2$ bits, hence $B_3^{(k)}=B_3^{(k,1)}B_3^{(k,0)}$ is the two bit binary representation of the integer $\beta_3$. Note that $$\beta_3 \in \left\{0, 1, \ldots, \binom{O_3}{Q} - 1\right\} = \{0, 1, 2, 3\}$$

for $O_3=4$, and Q=1, hence requires 2 bits for binary representation. The group indices or indicators $r_3^{(x)}$ for $x=0,1,\ldots,Q-1$ are as explained above.

In one alternative Alt 1-2, the third part of the bitmap (or bit sequence) $B_3=b_3^{(k,K_3-1)}b_3^{(k,K_3-2)}\ldots b_3^{(k,0)}$ has a fixed length $K_3$, where $b_3^{(K_3-1)}$ is the most significant bit (MSB) and $b_3^{(0)}$ is the least significant bit (LSB), and restricts FD DFT vectors $w_{r_3}$, where $r_3 \in \{0, 1, \ldots, N_3O_3-1\}$. Note that the bitmap $B_3$ restricts the FD vectors, hence $K_3=N_3O_3$. The UE shall be configured with restrictions for Q FD vectors indicated by $r_3^{(x)}$ for $x=0, 1, \ldots, Q-1$. The remaining FD vectors are not restricted. The value Q is either unrestricted or fixed (e.g. Q=N3) or configured via higher layer RRC or more dynamic MAC CE based or (UL-related or DL-related) DCI signaling. In one example, when Q is unrestricted, then $K_3=N_3O_3$. In another example, when Q is fixed, the number of restricted FD vectors is fixed, hence instead of length $K_3=N_3O_3$, the length of the bitmap $B_3$ can be reduced to $$K_3 = \left\lceil \log_2 \binom{N_3O_3}{Q} \right\rceil \text{bits}.$$

bits. In this alternative,
$B_3=b_3^{(K_3-1)}\ldots b_3^{(0)}$ is the binary representation of the integer $$\beta_3 \in \left\{0, 1, \ldots, \binom{N_3O_3}{Q} - 1\right\}.$$

The group indices or indicators $r_3^{(x)}$ for $x=0, 1, \ldots, Q-1$ are as explained above.

In one example, this restriction on FD vectors is independent of the restriction on the SD vectors/vector groups (as in embodiment 0); hence, the restriction on FD vectors applies regardless whether of any restriction on SD vectors/vector groups. In another example, this restriction on FD vectors is applicable together with the restriction on SD vectors/vector groups; hence, the restriction on FD vectors applies only when the corresponding SD vectors/vector groups (when together used for PMI reporting) is also restricted. For instance, the restriction on FD vectors applies only to SD vectors comprising the P SD vector groups that are restricted (embodiment 0).

In one alternative Alt 1-3, the third part of the bitmap (or bit sequence) is the concatenation of P bit sequences $B_3=B_3^{(0)}B_3^{(1)}\ldots B_3^{(P-1)}$, where the k-th bit sequence $B_3^{(k)}=b_3^{(k,K_3-1)}b_3^{(k,K_3-2)}\ldots b_3^{(k,0)}$ restricts Q FD vectors $W_{r_3}$, where $r_3 \in \{0, 1, \ldots, N_3O_3-1\}$ corresponding to the k-th SD vector group restricted via the bitmap $B_1$. The UE shall be configured with restrictions for Q FD vectors indicated by $r_3^{(x)}$ for $x=0, 1, \ldots, Q-1$. The remaining FD vectors are not restricted. The value Q is either unrestricted or fixed (e.g. Q=N3) or configured via higher layer RRC or more dynamic MAC CE based or (UL-related or DL-related) DCI signaling. In one example, when Q is unrestricted, then $K_3=N_3O_3$. In another example, when Q is fixed, the number of restricted FD vectors is fixed, hence instead of length $K_3=N_3O_3$, the length of the bitmap $B_3^{(k)}$ can be reduced to $$K_3 = \left\lceil \log_2 \binom{N_3O_3}{Q} \right\rceil \text{bits}.$$

In this alternative,
$B_3^{(k)}=b_3^{(k,K_3-1)}\ldots b_3^{(k,0)}$ is the binary representation of the integer $$\beta_3 \in \left\{0, 1, \ldots, \binom{N_3O_3}{Q} - 1\right\}.$$

The group indices or indicators $r_3^{(x)}$ for $x=0, 1, \ldots, Q-1$ are as explained above.

In embodiment 1A, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer $l=1,\ldots,v$, where v is the associated RI value, is given by $W^l=AC_lB^H$, where $N_1$, $N_2$, $N_3$, and $c_{l,i,m}$ are defined as above except that the matrix A comprises port selection vectors. For instance, the L antenna ports per polarization or column vectors of A are selected by the index $q_l$, where $$q_l \in \left\{0, 1, \ldots, \left\lceil \frac{P_{CSI-RS}}{2d} \right\rceil - 1\right\} \left(\text{this requires } \left\lceil \log_2 \left\lceil \frac{P_{CSI-RS}}{2d} \right\rceil \right\rceil \text{bits}\right),$$

and the value of d is configured with the higher layer parameter PortSelectionSamplingSize, where $d \in \{2, 3, 4\}$ and $$d \le \min\left(\frac{P_{CSI-RS}}{2}, L\right).$$

To report columns of A, the port selection vectors are used, For instance, $a_i=v_m$, where the quantity $v_m$ is a $P_{CSI-RS}/2$-element column vector containing a value of 1 in element (m mod $P_{CSI-RS}/2$) and zeros elsewhere (where the first element is element 0). The UE a UE is further configured with CBSR via higher layer (e.g. RRC) signaling, wherein the CBSR restricts FD beams or vectors $w_k$. In particular, it is according to embodiment 1 wherein $B_1$ and $B_2$ are empty, and the bit sequence $B=B_3$, details of which is according to at least one of Alt 1-0 and 1-2, as explained in embodiment 1.

In embodiment 2, a UE is configured with CBSR via higher layer (e.g., RRC) signaling, wherein the CBSR restricts both SD beams or vectors $v_{l,m}$, and FD beams or vectors $w_k$ where this restriction is joint (e.g. via a single bit sequence). The three-dimensional (3D) grid of oversampled DFT beams or vectors, as shown in FIG. 9, is partitioned into vector groups or vector-pair groups, where each vector group or vector-pair group is constructed jointly across SD and FD vector-pairs $(v_{l,m}, w_k)$. For brevity, the term "vector group" is used in the rest of the embodiment. The $N_1N_3O_1O_3$ DFT beams or grid points for one-dimensional (1D) antenna port layouts (when $N_2=1$) or $N_1N_2N_3O_1O_2O_3$ DFT beams or grid points for two-dimensional (2D) antenna port layouts (when $N_2>1$) are partitioned into joint SD/FD vector groups (or DFT beam groups) $G(r_1,r_2,r_3)$, where $(r1, r2, r3)$ is a joint SD/FD vector group indicator. The UE is configured with CBSR via higher layer (e.g. RRC) signaling of a bitmap (or bit sequence) $B=B_1B_2$ or $B_2B_1$, where one part of the bitmap (or bit sequence) $B_1=b_1^{(K_1-1)}b_1^{(K_1-2)} \ldots b_1^{(0)}$ has a fixed length $K_1$, where $b_1^{(K_1-1)}$ is the most significant bit (MSB) and $b_1^{(0)}$ is the least significant bit (LSB), and restricts joint SD/FD vector groups $G(r_1, r_2, r_3)$. In one example, $G(r_1, r_2, r_3)$ is defined as follows.

For 1D port layouts (N2=1), $r_2=0$ and $(r_1, r_3)$ indicates a joint SD/FD vector group $G(r_1, r_2, r_3)$ comprising $N_1N_3$ adjacent or non-orthogonal DFT vector-pairs $\{(v_{N_1r_1+x_1,0}, w_{N_3r_3+x_3}): x_1=0, 1, \ldots, N_1-1,$ and $x_3=0, 1, \ldots, N_3-1\}$. The range of values for $r_1$ and $r_3$ are $\{0, 1, \ldots, O_1-1\}$ and $\{0, 1, \ldots, O_3-1\}$, respectively. The bitmap $B_1$ restricts the values for vector group indicator $(r_1, r_3)$ and hence $K_1=O_1O_3$.

For 2D port layouts (N2>1), $(r_1, r_2, r_3)$ indicates a joint SD/FD vector group $G(r_1, r_2, r_3)$ comprising $N_1N_2N_3$ adjacent or non-orthogonal DFT vector-pairs $\{(v_{N_ir_i+x_i,0}, w_{N_3r_3+x_3}): x_i=0, 1, \ldots, N_i-1,$ for all $i=0, 1, 2\}$. The range of values for $r_i$ is $\{0, 1, \ldots O_i-1\}$ for all $i \in \{0, 1, 2\}$. The bitmap $B_1$ restricts the values for vector group indicator $r_2, r_3$ and hence $K_1=O_1O_2O_3$.

The UE may be configured with restrictions for P joint SD/FD vector groups indicated by $(r_1^{(k)}, r_2^{(k)}, r_3^{(k)})$ for $k=0, 1, \ldots, P-1$ and identified by the group indices $g^{(k)}=O_1O_2r_3^{(k)}+O_1r_2^{(k)}+r_1^{(k)}$ for $k=0, 1, \ldots, P-1$, where the indices are assigned such that $g^{(k)}$ increases as k increases. The remaining joint SD/FD vector groups are not restricted.

The value P is either fixed (e.g. P=4 or 8 or 12 or 16) or configured via higher layer RRC or more dynamic MAC CE based or (UL-related or DL-related) DCI signaling.

In one example, when P is fixed, the number of restricted joint SD/FD vector groups is fixed, hence instead of length $K_1=O_1O_3$ or $O_1O_2O_3$, the length of the bitmap $B_1$ can be reduced to $$K_1 = \left\lceil \log_2 \binom{O_1O_3}{P} \right\rceil \text{ bits}$$

for 1D port layout and $$K_1 = \left\lceil \log_2 \binom{O_1O_2O_3}{P} \right\rceil \text{ bits}$$

for 2D port layouts. Alternatively, $$K_1 = \left\lceil \log_2 \binom{O_1O_2O_3}{P} \right\rceil$$

for both 1D and 2D port layouts, where $(O1, O2)=(4, 1)$ for 1D port layouts, and $(O1, O2)=(4, 4)$ for 2D port layouts. In this alternative, when P=4:

for 1D port layout ($N_2=1$), the length is $K_1=11$ bits, hence $B_1=b_1^{(10)} \ldots b_1^{(0)}$ is the eleven bit binary representation of the integer $\beta_1$. Note that $$\beta_1 \in \left\{0, 1, \ldots, \binom{O_1O_3}{P}-1\right\} = \{0, 1, \ldots, 1819\}$$

for $O1=O3=4$, and $P=4$, hence requires 11 bits for binary representation. The group indices $g^{(k)}$ and indicators $(r_1^{(k)}, r_2^{(k)}, r_3^{(k)})$ for are as explained above. Alternatively, $K_1=16$, hence $B_1$ is a bitmap comprising P ones "1" indicating the P vector groups. Alternatively, $K_1=16$, hence $B_1$ is a bitmap comprising P zeros "0" indicating the P vector groups; and for 2D port layout ($N_2>1$), the length is $K_1=20$ bits, hence $B_1=b_1^{(19)} \ldots b_1^{(0)}$ is the twenty bit binary representation of the integer $\beta_1$. Note that $$\beta_1 \in \left\{0, 1, \ldots, \binom{O_1O_2O_3}{P}-1\right\} = \{0, 1, \ldots, 635375\}$$

for $O1=O2=O3=4$, and $P=4$, hence requires 20 bits for binary representation. The group indices $g^{(k)}$ and indicators $(r_1^{(k)}, r_2^{(k)}, r_3^{(k)})$ for $k=0, 1, 2, 3$ are as explained above. Alternatively, $K_1=64$, hence $B_1$ is a bitmap comprising P ones "1" indicating the P vector groups. Alternatively, $K_1=64$, hence $B_1$ is a bitmap comprising P zeros "0" indicating the P vector groups.

Likewise, when P=16"

for 1D port layout ($N_2=1$), the length is $K_1=0$ (i.e., $B_1$ is empty, hence not indicated/configured), and $g^{(k)}=O_1r_3^{(k)}+r_1^{(k)}$ for $k=0, 1, \ldots, 15$; and for 2D port layout ($N_2>1$), the length is $K_1=49$ bits, hence $B_1=b_1^{(48)} \ldots b_1^{(0)}$ is the forty nine bit binary representation of the integer $\beta_1$. Note that $$\beta_1 \in \left\{0, 1, \ldots, \binom{O_1O_2O_3}{P}-1\right\} = \{0, 1, \ldots, 4.8852694 \times 10^{14} - 1\}$$

for $O1=O2=O3=4$, and P=16, hence requires 49 bits for binary representation. The group indices $g^{(k)}$ and indicators $(r_1^{(k)}, r_2^{(k)}, r_3^{(k)})$ for $k=0, 1, 2, \ldots, 15$ are as explained above. Alternatively, $K_1=64$, hence $B_1$ is a bitmap comprising P ones "1" indicating the P vector groups. Alternatively, $K_1=64$, hence $B_1$ is a bitmap comprising P zeros "0" indicating the P vector groups.

In one example, $B_2$ is empty.

In another example, the another part of the bitmap (or bit sequence) $B_2$ has a length that depends on the number (P) of joint SD/FD vector groups that are restricted (e.g. set to 0) via the first bitmap $B_1$. In particular, $B_2=B_2^{(0)}B_2^{(1)} \ldots B_2^{(P-1)}$ is the concatenation of P bitmaps $B_2^{(k)}$ for $k=0, 1, \ldots, P-1$, corresponding to the vector group indices $g^{(k)}$. The k-th bitmap $B_2^{(k)}$ is defined as $B_2^{(k)}=b_2^{(k,K_2-1)}b_2^{(k,K_2-2)} \ldots b_2^{(k,0)}$, and is according to at least one of the alternatives (Alt 0-1 through Alt 0-5) in embodiment 0.

In a variation, the bitmap (or bit sequence) B includes a bit sequence $B_{ph}$ to indicate/restrict the allowed values of the phase coefficients $\phi_{l,i,m}$ for the P vector groups. The amplitude coefficient restriction is according to one of the above alternatives. At least one of the following alternatives is used for phase restriction.

In one alternative Alt 0-a: the bit sequence $B_{ph} = b_{ph}^{(K_{ph}-1)} \ldots b_{ph}^{(0)}$, where $K_{ph}$ is the length of the bit sequence, $b_{ph}^{(K_{ph}-1)}$ is the MSB and $b_{ph}^{(0)}$ is the LSB. The phase restriction is common for all P vector groups.

In one alternative Alt 0-b: the bit sequence $B_{ph} = B_{ph}^{(0)} \ldots b_{ph}^{(P-1)}$ is the concatenation of P bit sequences, where the bit sequence $B_{ph} = b_{ph}^{(K_{ph}-1)} \ldots b_{ph}^{(0)}$, where $K_{ph}$ is the length of the bit sequence, $b_{ph}^{(k,K_{ph}-1)}$ is the MSB and $b_{ph}^{(k,0)}$ is the LSB. The bit sequence $B_{ph}^{(k)}$ indicates/restricts the allowed values of the phase coefficients $\phi_{l,i,m}$ for the k-th vector group.

In one example, $K_{ph}=1$ and 1-bit indication ($b_{ph}^{(0)}$ or $b_{ph}^{(k,0)}$) is used to indicate the phase restriction. For example, when $b_{ph}^{(0)}$ or $b_{ph}^{(k,0)}$ equals 1, then the allowed values of the phase coefficients $\phi_{l,i,m}$ for the P vector groups corresponds to a $N_{PSK}$-PSK alphabet and when $b_{ph}^{(0)}$ or $b_{ph}^{(k,0)}$ equals 0, then the allowed values of the phase coefficients $\phi_{l,i,m}$ for the P vector groups is restricted to a ($N_{PSK}-1$)-PSK alphabet, where $N_{PSK}$ is configured from $\{4,8\}$ or $\{8,16\}$, and the $N_{PSK}$-PSK alphabet is given by $$\{e^{j2\pi p_{l,i,m}/N_{PSK}} : p_{l,i,m} = 0, 1, \ldots, N_{PSK} - 1\}.$$

When at least one of SD/FD vectors/vector groups, amplitude (first, second, or both) coefficients, and phase coefficients are restricted according to at least one of the above-mentioned alternatives, then the payload (number of bits) to report them can be adapted (or reduced). Alternatively, the payload is not adapted (hence remains the same) regardless of whether CBSR is applied or not.

Figure 12:
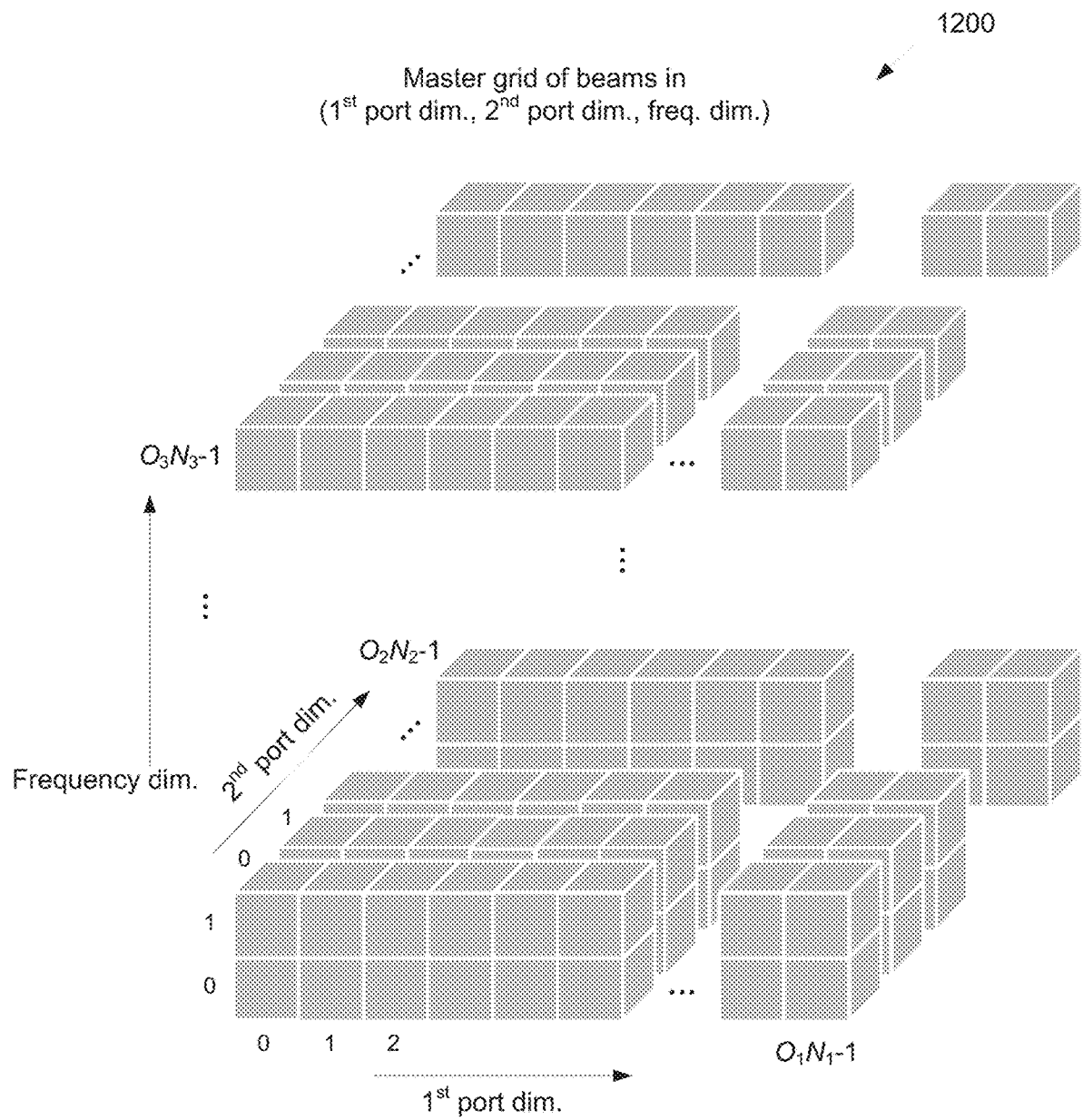
FIG. 12 illustrates a 3D grid of oversampled DFT beams according to embodiments of the present disclosure.

FIG. 12 illustrates a 3D grid 1200 of oversampled DFT beams according to embodiments of the present disclosure. The embodiment of the 3D grid 1200 illustrated in FIG. 12 is for illustration only. FIG. 12 does not limit the scope of this disclosure to any particular implementation of the 3D grid 1200.

In embodiment 2A, a UE is configured with CBSR via higher layer (e.g. RRC) signaling, wherein the CBSR restricts both SD beams or vectors $v_{l,m}$, and FD beams or vectors $w_k$ where this restriction is joint (e.g. via a single bit sequence). The three-dimensional (3D) grid of oversampled DFT beams or vectors, as shown in FIG. 12, is used to obtain outer product matrix $M_{l,m,k} = v_{l,m} w_k^H$ or $M_{l,m,k} = v_{l,m} w_k^*$, where the notations $(x)^*$ and $(x)^H$ respectively indicate complex conjugate and complex conjugate transpose of x. In the rest of the embodiment, $M_{l,m,k} = v_{l,m} w_k^H$ is used. The embodiment, however, is general and is applicable to $M_{l,m,k} = v_{l,m} w_k^*$. In one example, $$M_{l,m,k} = v_{l,m} w_k^* = \left[ v_{l,m} \quad e^{-j\frac{2\pi k}{O_3 N_3}} v_{l,m} \quad \ldots \quad e^{-j\frac{2\pi k(N_3-1)}{O_3 N_3}} v_{l,m} \right].$$

The set of all possible outer product matrices are then partitioned into matrix groups. In particular, the $N_1 N_3 O_1 O_3$ DFT beams or grid points for one-dimensional (1D) antenna port layouts (when $N_2=1$) or $N_1 N_2 N_3 O_1 O_2 O_3$ DFT beams or grid points for two-dimensional (2D) antenna port layouts (when $N_2>1$) are partitioned into matrix groups $G(r_1,r_2,r_3)$, where (r1, r2, r3) is a matrix group indicator. The UE is configured with CBSR via higher layer (e.g. RRC) signaling of a bitmap (or bit sequence) $B=B_1 B_2$ or $B_2 B_1$, where one part of the bitmap (or bit sequence) $B_1 = b_1^{(K_1-1)} b_1^{(K_1-2)} \ldots b_1^{(0)}$ has a fixed length $K_1$, where $b_1^{(K_1-1)}$ is the most significant bit (MSB) and $b_1^{(0)}$ is the least significant bit (LSB), and restricts matrix groups $G(r_1,r_2,r_3)$. In one example, $G(r_1,r_2,r_3)$ is defined as follows.

For 1D port layouts (N2=1), $r_2=0$ and $(r_1,r_3)$ indicates a matrix group $G(r_1, r_2, r_3)$ comprising $N_1 N_3$ outer product matrices $\{M_{N_1 r_1 + x_1, 0, N_3 r_3 + x_3} = v_{N_1 r_1 + x_1, 0} w_{N_3 r_3 + x_3}^H : x_1 = 0, 1, \ldots, N_1-1,$ and $x_3 = 0, 1, \ldots, N_3-1\}$. The range of values for $r_1$ and $r_3$ are $\{0, 1, \ldots, O_1-1\}$ and $\{0, 1, \ldots, O_3-1\}$, respectively. The bitmap $B_1$ restricts the values for matrix group indicator $(r_1, r_3)$ and hence $K_1 = O_1 O_3$.

For 2D port layouts (N2>1), $(r_1,r_2,r_3)$ indicates matrix group $G(r_1,r_2, r_3)$ comprising $N_1 N_2 N_3$ outer product matrices $\{M_{N_1 r_1 + x_1, 0, N_3 r_3 + x_3} = v_{N_1 r_1 + x_1, 0} w_{N_3 r_3 + x_3}^H : x_i = 0, 1, \ldots, N_1 1,$ for all $i=0,1,2\}$. The range of values for $r_i$ is $\{0, 1, \ldots, O_i-1\}$ for all $i \in \{0,1,2\}$. The bitmap $B_1$ restricts the values for matrix group indicator $r_3$) and hence $K_1 = O_1 O_2 O_3$.

The UE may be configured with restrictions for P matrix groups indicated by $(r_1^{(k)}, r_2^{(k)}, r_3^{(k)})$ for $k=0, 1, \ldots, P-1$ and identified by the group indices $g^{(k)} = O_1 O_2 r_3^{(k)} + O_1 r_2^{(k)} + r_1^{(k)}$ for $k=0, 1, \ldots, P-1$, where the indices are assigned such that $g^{(k)}$ increases as k increases. The remaining matrix groups are not restricted.

The value P is either fixed (e.g. P=4 or 8 or 12 or 16) or configured via higher layer RRC or more dynamic MAC CE based or (UL-related or DL-related) DCI signaling.

In one example, when P is fixed, the number of restricted matrix groups is fixed, hence instead of length $K_1 = O_1 O_3$ or $O_1 O_2 O_3$, the length of the bitmap $B_1$ can be reduced to $K_1 =$ $$K_1 = \left\lceil \log_2 \binom{O_1 O_3}{P} \right\rceil$$

for 1D port layout and $$K_1 = \left\lceil \log_2 \binom{O_1 O_2 O_3}{P} \right\rceil$$

bits for 2D port layouts. Alternatively, $$K_1 = \left\lceil \log_2 \binom{O_1 O_2 O_3}{P} \right\rceil$$

for both 1D and 2D port layouts, where (O1, O2)=(4, 1) for 1D port layouts, and (O1, O2)=(4, 4) for 2D port layouts. In this alternative, when P=4:

for 1D port layout (N2=1), the length is $K_1=11$ bits, hence $B_1 = b_1^{(10)} \ldots b_1^{(0)}$ is the eleven bit binary representation of the integer $\beta_1$. Note that $$\beta \in \left\{0, 1, \ldots, \binom{O_1 O_3}{P} - 1\right\} = \{0, 1, \ldots, 1819\}$$

for O1=O3=4, and P=4, hence requires 11 bits for binary representation. The group indices $g^{(k)}$ and indicators $(r_1^{(k)}, r_2^{(k)}, r_3^{(k)})$ for are as explained above. Alternatively, $K_1=16$, hence $B_1$ is a bitmap comprising P ones "1" indicating the P matrix groups. Alternatively, $K_1=16$, hence $B_1$ is a bitmap comprising P zeros "0" indicating the P matrix groups; and for 2D port layout (N2>1), the length is $K_1=20$ bits, hence $B_1 = b_1^{(19)} \ldots b_1^{(0)}$ is the twenty bit binary representation of the integer $\beta_1$. Note that $$\beta_1 \in \left\{0, 1, \ldots, \binom{O_1 O_2 O_3}{P} - 1\right\} = \{0, 1, \ldots, 635375\}$$

for O1=O2=O3=4, and P=4, hence requires 20 bits for binary representation. The group indices $g^{(k)}$ and indicators $(r_1^{(k)}, r_2^{(k)}, r_3^{(k)})$ for k=0, 1, 2, 3 are as explained above. Alternatively, $K_1=64$, hence $B_1$ is a bitmap comprising P ones "1" indicating the P matrix groups. Alternatively, $K_1=64$, hence $B_1$ is a bitmap comprising P zeros "0" indicating the P matrix groups.

Likewise, when P=16:

for 1D port layout ($N_2=1$), the length is $K_1=0$ (i.e., $B_1$ is empty, hence not indicated/configured), and $g^{(k)} = O_1 r_3^{(k)} + r_1^{(k)}$ for k=0, 1, ..., 15; and for 2D port layout ($N_2>1$), the length is $K_1=49$ bits, hence $B_1 = b_1^{(48)} \ldots b_1^{(0)}$ is the forty nine bit binary representation of the integer $\beta_1$. Note that $$\beta \in \left\{0, 1, \ldots, \binom{O_1 O_2 O_3}{P} - 1\right\} = \{0, 1, \ldots, 4.8852694 \times 10^{14} - 1\}$$

for O1=O2=O3=4, and P=16, hence requires 49 bits for binary representation. The group indices $g^{(k)}$ and indicators $(r_1^{(k)}, r_2^{(k)}, r_3^{(k)})$ for k=0, 1, 2, ..., 15 are as explained above. Alternatively, $K_1=64$, hence $B_1$ is a bitmap comprising P ones "1" indicating the P matrix groups. Alternatively, $K_1=64$, hence $B_1$ is a bitmap comprising P zeros "0" indicating the P matrix groups.

In one example, $B_2$ is empty.

In another example, the another part of the bitmap (or bit sequence) $B_2$ has a length that depends on the number (P) of matrix groups that are restricted (e.g. set to 0) via the first bitmap $B_1$. In particular, $B_2 = B_2^{(0)} B_2^{(1)} \ldots B_2^{(P-1)}$ is the concatenation of P bitmaps $B_2^{(k)}$ for k=0, 1, ..., P–1, corresponding to the matrix group indices $g^{(k)}$. The k-th bitmap $B_2^{(k)}$ is defined as $B_2^{(k)} = b_2^{(k,K_2-1)} b_2^{(k,K_2-2)} \ldots b_2^{(k,0)}$ and is according to at least one of the alternatives (Alt 0-1 through Alt 0-5) in embodiment 0.

In a variation, the bitmap (or bit sequence) B includes a bit sequence $B_{ph}$ to indicate/restrict the allowed values of the phase coefficients $\phi_{l,i,m}$ for the P matrix groups. The amplitude coefficient restriction is according to one of the above alternatives. At least one of the following alternatives is used for phase restriction.

In one alternative Alt 0-a: the bit sequence $B_{ph} = b_{ph}^{(K_{ph}-1)} \ldots b_{ph}^{(0)}$, where $K_{ph}$ is the length of the bit sequence, $b_{ph}^{(K_{ph}-1)}$ is the MSB and $b_{ph}^{(0)}$ is the LSB. The phase restriction is common for all P vector groups.

In one alternative Alt 0-b: the bit sequence $B_{ph} = B_{ph}^{(0)} \ldots b_{ph}^{(P-1)}$ is the concatenation of P bit sequences, where the bit sequence $B_{ph}^{(k)} = b_{ph}^{(k,K_{ph}-1)} \ldots b_{ph}^{(k,0)}$, where $K_{ph}$ is the length of the bit sequence, $b_{ph}^{(k,K_{ph}-1)}$ is the MSB and $b_{ph}^{(k,0)}$ the LSB. The bit sequence $B_{ph}^{(k)}$ indicates/restricts the allowed values of the phase coefficients for the k-th matrix group.

In one example, $K_{ph}=1$ and 1-bit indication ($b_{ph}^{(0)}$ or $b_{ph}^{(k,0)}$) is used to indicate the phase restriction. For example, when $b_{ph}^{(0)}$ or $b_{ph}^{(k,0)}$ equals 1, then the allowed values of the phase coefficients $\phi_{l,i,m}$ for the P matrix groups corresponds to a $N_{PSK}$-PSK alphabet and when $b_{ph}^{(0)}$, or $b_{ph}^{(k,0)}$ equals 0, then the allowed values of the phase coefficients $\phi_{l,i,m}$ for the P matrix groups is restricted to a ($N_{PSK}-1$)-PSK alphabet, where $N_{PSK}$ is configured from $\{4,8\}$ or $\{8,16\}$, and the $N_{PSK}$-PSK alphabet is given by $$\{e^{j2\pi p_{l,i,m}/N_{PSK}} : p_{l,i,m} = 0, 1, \ldots, N_{PSK} - 1\}.$$

When at least one of matrices/matrix groups, amplitude (first, second, or both) coefficients, and phase coefficients are restricted according to at least one of the above-mentioned alternatives, then the payload (number of bits) to report them can be adapted (or reduced). Alternatively, the payload is not adapted (hence remains the same) regardless of whether CBSR is applied or not.

In embodiment 3, when the UE is configured with higher layer parameter codebookType set to 'typeIII' or 'typeII-Compression', the bitmap parameter typeIII-RI-Restriction or typeII-Compression-RI-Restriction forms the bit sequence $r_3 r_2 r_1 r_0$ where $r_0$ is the LSB and $r_3$ is the MSB. When $r_i$ is zero, $i \in \{0,1,2,3\}$, PMI and RI reporting are not allowed to correspond to any precoder associated with $\upsilon = i+1$ layers.

In embodiment 3A, when the UE is configured with higher layer parameter codebookType set to 'typeIII-PortSelection' or 'typeII-Compression-PortSelection', the bitmap parameter typeIII-PortSelectionRI-Restriction or typeII-Compression-PortSelection-RI-Restriction forms the bit sequence $r_3 r_2 r_1 r_0$ where $r_0$ is the LSB and $r_3$ is the MSB. When is zero, $i \in \{0,1,2,3\}$, PMI and RI reporting are not allowed to correspond to any precoder associated with $\upsilon = i+1$ layers.

Any of the above variation embodiments can be utilized independently or in combination with at least one other variation embodiment.

In embodiment X, each PMI value, indicating the precoder or precoding matrix according the framework (5), corresponds to the codebook indices $i_1$ and $i_2$ where $$i_1 = \begin{cases} [i_{1,1} \; i_{1,2} \; i_{1,5} \; i_{1,6,1} \; i_{1,7,1} \; i_{1,8,1}] & v=1 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2}] & v=2 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3}] & v=3 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3} \; i_{1,6,4} \; i_{1,7,4} \; i_{1,8,4}] & v=4 \end{cases}$$

$$i_2 = \begin{cases} [i_{2,3,1} \; i_{2,4,1} \; i_{2,5,1}] & v=1 \\ [i_{2,3,1} \; i_{2,4,1} \; i_{2,5,1} \; i_{2,3,2} \; i_{2,4,2} \; i_{2,5,2}] & v=2 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3}] & v=3 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4}] & v=4 \end{cases}$$

where
- $i_{1,1}$ are the rotation factors for the SD basis (same as in Rel. 15 Type II CSI codebook)
- $i_{1,2}$ is the SD basis indicator (same as in Rel. 15 Type II CSI codebook)
- $i_{1,5}$ is the $M_{initial}$ indicator when $N_3>19$, indicating the intermediate FD basis set InS comprising 2M FD basis vectors
- $i_{1,6,l}$ is the FD basis indicator for layer l, indicating M FD basis vectors
- $i_{1,7,l}$ is the bitmap for layer l, indicating the location of non-zero (NZ) coefficients
- $i_{1,8,l}$ is the strongest coefficient indicator (SCI) for layer l, indicating location of the strongest coefficient=1
- $i_{2,3,l}$ are the reference amplitudes ($p_{l,0}^{(1)}$) for layer l, indicating the reference amplitude coefficient for the weaker polarization
- $i_{2,4,l}$ is the matrix of the differential amplitude values ($p_{l,i,f}^{(2)}$) for layer l
- $i_{2,5,l}$ is the matrix of the phase values ($\varphi_{l,i,f}$) for layer l.

FIG. 13 illustrates a flow chart of a method 1300 for operating a user equipment (UE) for channel state information (CSI) reporting in a wireless communication system, as may be performed by a UE such as UE 116, according to embodiments of the present disclosure. The embodiment of the method 1300 illustrated in FIG. 13 is for illustration only. FIG. 13 does not limit the scope of this disclosure to any particular implementation.

As illustrates in FIG. 20, the method 1300 begins at step 1302. In step 1302, the UE (e.g., 111-116 as illustrated in FIG. 1) receives, from a base station (BS), higher layer signaling including codebook subset restriction (CBSR) information.

In step 1304, the UE identifies, based on a portion of the bitmap sequence B, a restriction on P spatial domain (SD) vector groups out of a total of Q SD vector groups.

In step 1306, the UE generates a CSI report based on the P SD vector groups with the identified restriction and remaining Q minus P SD vector groups without any restrictions.

In step 1308, the UE transmits, to the BS, the CSI feedback over an uplink channel.

The restriction on P SD vector groups corresponds to restricting an average amplitude ($A_i^{avg}$) associated with an SD vector $a_i$ in the P SD vector groups to a maximum allowed average amplitude ($\gamma_i$).

In one embodiment, the average amplitude ($A_i^{avg}$) associated with an SD vector $a_i$ is determined as a square root of an average power ($P_i^{avg}$), where the average power ($P_i^{avg}$) is determined by averaging $P_{i,m}$ over M frequency domain (FD) indices, $m=0, 1, \ldots, M-1$, and $P_{i,m}$ is a power of a coefficient with an SD index i and a FD index m.

In one embodiment, the coefficient with an SD index i and a FD index m is $c_{i,m}$, the power ($P_{i,m}$) of the coefficient $c_{i,m}$ equals a square of $p_{i,m}$, where $p_{i,m}$ is an amplitude of the coefficient $c_{i,m}$, the average power $$P_i^{avg} = \frac{1}{n}\sum_{m=0}^{M-1} P_{i,m} = \frac{1}{n}\sum_{m=0}^{M-1} p_{i,m}^2,$$

and the restriction on the average amplitude ($A_i^{avg}$) is applied as follows:

$$A_i^{avg} = \sqrt{\frac{1}{n}\sum_{m=0}^{M-1} p_{i,m}^2} \leq \gamma_i,$$

where n is a normalization factor.

In one embodiment, for each layer $l=1, \ldots, \upsilon$, where $\upsilon$ is a rank value: the coefficient with an SD index i and a FD index m is $c_{l,i,m}$, the power ($P_{i,m}$) of the coefficient $c_{l,i,m}$ equals a square of $p_{l,i,m}$, where $$p_{l,i,m} = p_{l,\lfloor i/L \rfloor}^{(1)} p_{l,i,m}^{(2)}$$

is an amplitude of the coefficient $c_{l,i,m}$, where $\lfloor \ \rfloor$ is a flooring function, the average power $$P_i^{avg} = \frac{1}{n}\sum_{m=0}^{M-1} P_{i,m} = \frac{1}{\sum_{m=0}^{M-1} b_{l,i,m}} \sum_{m=0}^{M-1} b_{l,i,m} p_{l,i,m}^2,$$

and the restriction on the average amplitude ($A_i^{avg}$) is applied as follows:

$$A_i^{avg} = \sqrt{\frac{1}{\sum_{m=0}^{M-1} b_{l,i,m}} \sum_{m=0}^{M-1} b_{l,i,m} p_{l,i,m}^2} \leq \gamma_i,$$

where n is a number of non-zero coefficients associated with an SD index i such that $$n = \sum_{m=0}^{M-1} b_{l,i,m},$$

and where $b_{l,i,m}=1$ if $c_{l,i,m}$ is non-zero and $b_{l,i,m}=0$ if $c_{l,i,m}$ is zero.

In one embodiment, the CSI report includes a precoding matrix indicator (PMI) indicating, for each layer $l=1, \ldots, \upsilon$, a precoding vector for each FD unit of a total number ($N_3$) of FD units as determined by columns of $$W^l = \begin{bmatrix} \sum_{i=0}^{L-1} a_i \sum_{m=0}^{M-1} c_{l,i,m}(b_{l,m}^H) \\ \sum_{i=0}^{L-1} a_i \sum_{m=0}^{M-1} c_{l,i+L,m}(b_{l,m}^H) \end{bmatrix},$$

wherein: $a_i$, $i=0, 1, \ldots, L-1$, are L SD vectors, $b_{l,m}$, $m=0, 1, \ldots, M-1$, are M FD vectors for layer l, $c_{l,i+pL,m}$, $i=0, 1, \ldots, L-1$, $p=0, 1$, and $m=0, 1, \ldots, M-1$, are 2LM coefficients for layer l, and the restriction on the average amplitude associated with an SD vector $a_i$ in the P SD vector groups is applied as follows:

$$\sqrt{\frac{1}{\sum_{m=0}^{M-1} b_{l,i+pL,m}} \sum_{m=0}^{M-1} b_{l,i+pL,m} (p_{l,p}^{(1)} p_{l,i,m}^{(2)})^2} \leq \gamma_{i+pL}.$$

In one embodiment, the portion of the bitmap sequence B equals $B_2 = B_2^{(1)} B_2^{(2)} \ldots B_2^{(P)}$, a concatenation of P bitmaps $B_2^{(k)}$ for $k=0, 1, \ldots, P-1$; the restriction on a k-th SD vector group of the P SD vector groups is indicated via a k-th bitmap $B_2^{(k)}$ of the P bitmaps; the k-th bitmap $B_2^{(k)} = b_2^{(k, 2N_1N_2-1)} \ldots b_2^{(k,0)}$ is of length $2N_1N_2$, where a bit pair $b_2^{(k,2(N_1x_2+x_1)+1)} b_2^{(k,2(N_1x_2+x_1))}$ indicates the maximum allowed average amplitude ($\gamma_i$) for an SD vector $a_i$ indexed by $i=(x1, x2)$ in the k-th SD vector group of the P SD vector groups, where N1 and N2 are higher layer configured; and a mapping of the bit pair to the maximum allowed average amplitude ($\gamma_i$) is determined based on a table given by:

| bit-pair $b_2^{(k,2(N_1x_2+x_1)+1)} b_2^{(k,2(N_1x_2+x_1))}$ | Maximum allowed average amplitude ($\gamma_i$) |
|---|---|
| 00 | 0 |
| 01 | $\sqrt{1/4} = \sqrt{0.25}$ |
| 10 | $\sqrt{1/2} = \sqrt{0.5}$ |
| 11 | 1 |

In one embodiment, a bit-pair value $b_2^{(k,2(N_1x_2+x_1)+1)} b_2^{(k,2(N_1x_2+x_1))} = 01$ or 10 is not configured via the CBSR information if the UE does not report that it is capable of supporting amplitude restriction in its capability signalling.

Figure 14:
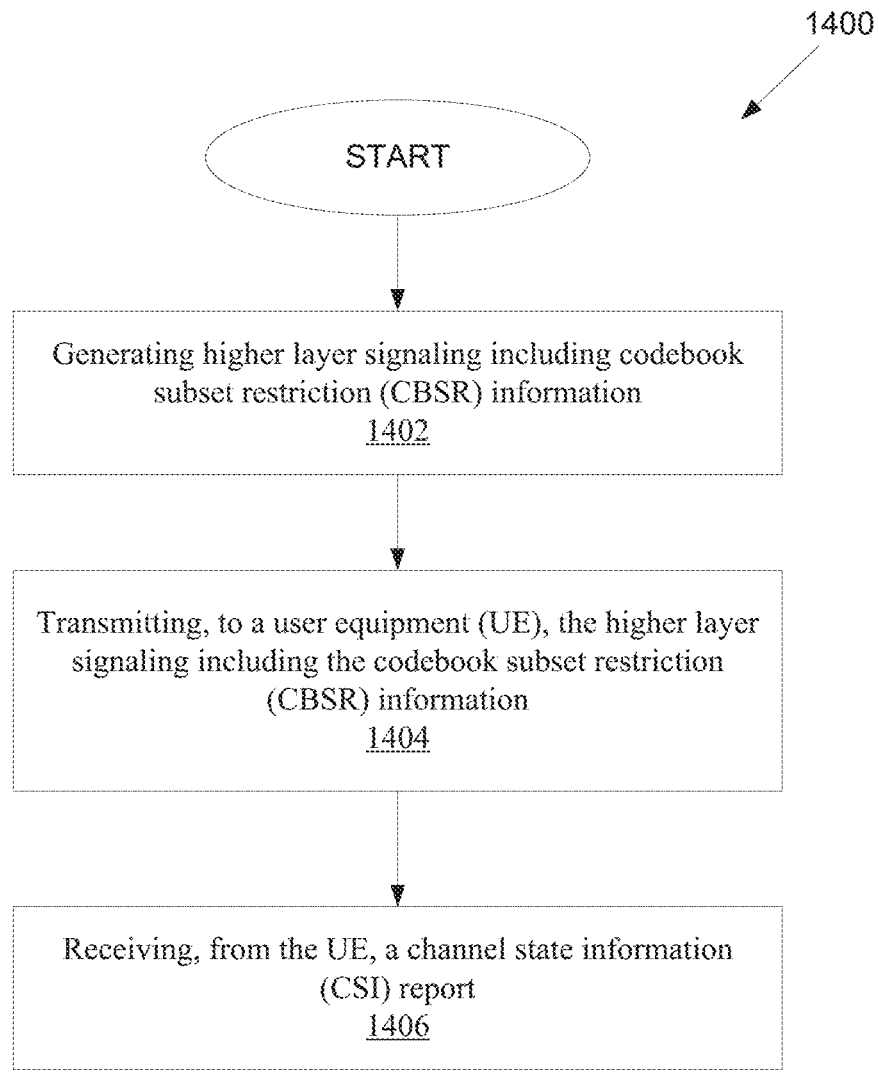
FIG. 14 illustrates a flow chart of another method for receiving an UL transmission including CSI reporting, as may be performed by a BS, according to embodiments of the present disclosure.

FIG. 14 illustrates a flow chart of another method 1400, as may be performed by a base station (BS) such as BS 102, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the BS (e.g., 101-103 as illustrated in FIG. 1), generates higher layer signaling including codebook subset restriction (CBSR) information CSI feedback configuration information.

In step 1404, the BS transmits, to a user equipment (UE), the higher layer signaling including the codebook subset restriction (CBSR) information.

In step 1406, the BS receives, from the UE, a channel state information (CSI) report.

A bitmap sequence B is determined based on the CBSR information.

A restriction on P spatial domain (SD) vector groups out of a total of Q SD vector groups is identified based on a portion of the bitmap sequence B.

The CSI report is generated based on the P SD vector groups with the identified restriction and remaining Q minus P SD vector groups without any restrictions.

The restriction on P SD vector groups corresponds to restricting an average amplitude ($A_i^{avg}$) associated with an SD vector $a_i$ in the P SD vector groups to a maximum allowed average amplitude ($\gamma_i$).

In one embodiment, the average amplitude ($A_i^{avg}$) associated with an SD vector $a_i$ is determined as a square root of an average power (where the average power ($P_i^{avg}$) is determined by averaging $P_{i,m}$ over M frequency domain (FD) indices, $m=0, 1, \ldots, M-1$, and $P_{i,m}$ is a power of a coefficient with an SD index i and a FD index m.

In one embodiment, the coefficient with an SD index i and a FD index m is $c_{i,m}$, the power ($P_{i,m}$) of the coefficient $c_{i,m}$ equals a square of $p_{i,m}$ where $p_{i,m}$ is an amplitude of the coefficient $c_{i,m}$, the average power $$P_i^{avg} = \frac{1}{n} \sum_{m=0}^{M-1} P_{i,m} = \frac{1}{n} \sum_{m=0}^{M-1} p_{i,m}^2,$$

and the restriction on the average amplitude ($A_i^{avg}$) is applied as follows:

$$A_i^{avg} = \sqrt{\frac{1}{n} \sum_{m=0}^{M-1} p_{i,m}^2} \leq \gamma_i,$$

where n is a normalization factor.

In one embodiment, for each layer $l=1, \ldots, \upsilon$, where $\upsilon$ is a rank value: the coefficient with an SD index i and a FD index m is $c_{l,i,m}$, the power ($P_{i,m}$) of the coefficient $c_{l,i,m}$ equals a square of $p_{l,i,m}$, where $$p_{l,i,m} = p_{l,\lfloor \frac{i}{L} \rfloor}^{(1)} p_{l,i,m}^{(2)}$$

is an amplitude of the coefficient $c_{l,i,m}$, where $\lfloor \: \rfloor$ is a flooring function, the average power $$P_i^{avg} = \frac{1}{n} \sum_{m=0}^{M-1} P_{i,m} = \frac{1}{\sum_{m=0}^{M-1} b_{l,i,m}} \sum_{m=0}^{M-1} b_{l,i,m} p_{l,i,m}^2,$$

and the restriction on the average amplitude ($A_i^{avg}$) is applied as follows:

$$A_i^{avg} = \sqrt{\frac{1}{\sum_{m=0}^{M-1} b_{l,i,m}} \sum_{m=0}^{M-1} b_{l,i,m} p_{l,i,m}^2} \leq \gamma_i,$$

where n is a number of non-zero coefficients associated with an SD index i such that $$n = \sum_{m=0}^{M-1} b_{l,i,m},$$

and where $b_{l,i,m}=1$ if $c_{l,i,m}$ is non-zero and $b_{l,i,m}=0$ if $c_{l,i,m}$ is zero.

In one embodiment, the CSI report includes a precoding matrix indicator (PMI) indicating, for each layer $l=1, \ldots \upsilon$, a precoding vector for each FD unit of a total number ($N_3$) of FD units as determined by columns of $$W^l = \begin{bmatrix} \sum_{i=0}^{L-1} a_i \sum_{m=0}^{M-1} c_{l,i,m}(b_{l,m}^H) \\ \sum_{i=0}^{L-1} a_i \sum_{m=0}^{M-1} c_{l,i+L,m}(b_{l,m}^H) \end{bmatrix},$$

wherein: $a_i$, $i=0, 1, \ldots, L-1$, are L SD vectors, $b_{l,m}$, $m=0, 1, \ldots, M-1$, are M FD vectors for layer l, $c_{l,i+pL,m}$, $i=0, 1, \ldots, L-1$, $p=0, 1$, and $m=0, 1, \ldots, M-1$, are 2LM coefficients for layer l, and the restriction on the average amplitude associated with an SD vector $a_i$ in the P SD vector groups is applied as follows:

$$\sqrt{\frac{1}{\sum_{m=0}^{M-1} b_{l,i+pL,m}} \sum_{m=0}^{M-1} b_{l,i+pL,m}(p_{l,p}^{(1)} p_{l,i,m}^{(2)})^2} \leq \gamma_{i+pL}.$$

In one embodiment, the portion of the bitmap sequence B equals $B_2 = B_2^{(1)} B_2^{(2)} \ldots B_2^{(P)}$, a concatenation of P bitmaps $B_2^{(k)}$ for $k=0, 1, \ldots, P-1$; the restriction on a k-th SD vector group of the P SD vector groups is indicated via a k-th bitmap $B_2^{(k)}$ of the P bitmaps; the k-th bitmap $B_2^{(k)} = b_2^{(k,2N_1N_2-1)} \ldots b_2^{(k,0)}$ is of length $2N_1N_2$, where a bit pair $b_2^{(k,2(N_1x_2+x_1)+1)} b_2^{(k,2(N_1x_2+x_1))}$ indicates the maximum allowed average amplitude ($\gamma_i$) for an SD vector $a_i$ indexed by $i=(x_1, x_2)$ in the k-th SD vector group of the P SD vector groups, where N1 and N2 are higher layer configured; and a mapping of the bit pair to the maximum allowed average amplitude ($\gamma_i$) is determined based on a table given by:

| bit-pair $b_2^{(k,2(N_1x_2+x_1)+1)} b_2^{(k,2(N_1x_2+x_1))}$ | Maximum allowed average amplitude ($\gamma_i$) |
|---|---|
| 00 | 0 |
| 01 | $\sqrt{1/4} = \sqrt{0.25}$ |
| 10 | $\sqrt{1/2} = \sqrt{0.5}$ |
| 11 | 1 |

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) for channel state information (CSI) reporting in a wireless communication system, the UE comprising:
   a transceiver configured to receive, from a base station (BS), higher layer signaling including codebook subset restriction (CBSR) information; and
   a processor operably connected to the transceiver, the processor configured to:
      determine a bitmap sequence B based on the CBSR information,
      identify, based on a portion of the bitmap sequence B, a restriction on P spatial domain (SD) vector groups out of a total of Q SD vector groups, and
      generate a CSI report based on the P SD vector groups with the identified restriction and remaining Q minus P SD vector groups without any restrictions,
   wherein the transceiver is further configured to transmit the CSI report to the BS,
   wherein the restriction on P SD vector groups corresponds to restricting an average amplitude ($A_i^{avg}$) associated with an SD vector $a_i$ in the P SD vector groups to a maximum allowed average amplitude ($\gamma_i$).

2. The UE of claim 1, wherein the average amplitude ($A_i^{avg}$) associated with an SD vector $a_i$ is determined as a square root of an average power ($P_i^{avg}$), where the average power ($P_i^{avg}$) is determined by averaging $P_{i,m}$ over M frequency domain (FD) indices, $m=0, 1, \ldots, M-1$, and $P_{i,m}$ is a power of a coefficient with an SD index i and a FD index m.

3. The UE of claim 2, wherein:
   the coefficient with an SD index i and a FD index m is $c_{i,m}$,
   the power ($P_{i,m}$) of the coefficient $c_{i,m}$, equals a square of $p_{i,m}$, where $p_{i,m}$ is an amplitude of the coefficient $c_{i,m}$,
   the average power $$P_i^{avg} = \frac{1}{n} \sum_{m=0}^{M-1} P_{i,m} = \frac{1}{n} \sum_{m=0}^{M-1} p_{i,m}^2, \text{ and}$$

the restriction on the average amplitude ($A_i^{avg}$) is applied as follows:

$$A_i^{avg} = \sqrt{\frac{1}{n} \sum_{m=0}^{M-1} p_{i,m}^2} \leq \gamma_i,$$

where n is a normalization factor.

4. The UE of claim 2, wherein, for each layer $l=1, \ldots, \upsilon$, where $\upsilon$ is a rank value:
   the coefficient with an SD index i and a FD index m is $c_{l,i,m}$,
   the power ($P_{i,m}$) of the coefficient $c_{l,i,m}$, equals a square of $p_{l,i,m}$, where $$p_{l,i,m} = p_{l,\lfloor \frac{i}{L} \rfloor}^{(1)} p_{l,i,m}^{(2)}$$

is an amplitude of the coefficient $c_{l,i,m}$, where $\lfloor \ \rfloor$ a flooring function,
   the average power $$P_i^{avg} = \frac{1}{n} \sum_{m=0}^{M-1} P_{i,m} = \frac{1}{\sum_{m=0}^{M-1} b_{l,i,m}} \sum_{m=0}^{M-1} b_{l,i,m} p_{l,i,m}^2,$$

and the restriction on the average amplitude ($A_i^{avg}$) is applied as follows:

$$A_i^{avg} = \sqrt{\frac{1}{\sum_{m=0}^{M-1} b_{l,i,m}} \sum_{m=0}^{M-1} b_{l,i,m} p_{l,i,m}^2} \le \gamma_i,$$

where n is a number of non-zero coefficients associated with an SD index i such that $$n = \sum_{m=0}^{M-1} b_{l,i,m}, \text{ and}$$

where $b_{l,i,m}=1$ if $c_{l,i,m}$ is non-zero and $b_{l,i,m}=0$ if $c_{l,i,m}$ is zero.

5. The UE of claim 4, wherein the CSI report includes a precoding matrix indicator (PMI) indicating, for each layer $l=1, \ldots, \upsilon$, a precoding vector for each FD unit of a total number ($N_3$) of FD units as determined by columns of $$W^l = \begin{bmatrix} \sum_{i=0}^{L-1} a_i \sum_{m=0}^{M-1} c_{l,i,m}(b_{l,m}^H) \\ \sum_{i=0}^{L-1} a_i \sum_{m=0}^{M-1} c_{l,i+L,m}(b_{l,m}^H) \end{bmatrix},$$

wherein:

$a_i$, $i=0, 1, \ldots, L-1$, are L SD vectors,
$b_{l,m}$, $m=0, 1, \ldots, M-1$, are M FD vectors for layer l,
$c_{l,i+pL,m}$, $i=0, 1, \ldots, L-1$, $p=0,1$, and $m=0, 1, \ldots, M-1$, are 2LM coefficients for layer l, and
the restriction on the average amplitude associated with an SD vector $a_i$ in the P SD vector groups is applied as follows:

$$\sqrt{\frac{1}{\sum_{m=0}^{M-1} b_{l,i+pL,m}} \sum_{m=0}^{M-1} b_{l,i+pL,m}(p_{l,p}^{(1)} p_{l,i,m}^{(2)})^2} \le \gamma_{i+pL}.$$

6. The UE of claim 1, wherein:
the portion of the bitmap sequence B equals $B_2=(B_2^{(1)} B_2^{(2)} \ldots B_2^{(P)})$, a concatenation of P bitmaps $B_2^{(k)}$ for $k=0, 1, \ldots, P-1$;
the restriction on a k-th SD vector group of the P SD vector groups is indicated via a k-th bitmap $B_2^{(k)}$ of the P bitmaps;
the k-th bitmap $B_2^{(k)}=b_2^{(k,2N_1N_2-1)} \ldots b_2^{(k,0)}$ is of length $2N_1N_2$, where a bit pair $b_2^{(k,2(N_1x_2+x_1)+1)}$, $b_2^{(k,2(N_1x_2+x_1))}$ indicates the maximum allowed average amplitude ($\gamma_i$) for an SD vector $a_i$ indexed by $i=(x_1, x_2)$ in the k-th SD vector group of the P SD vector groups, where $N_1$ and $N_2$ are higher layer configured; and
a mapping of the bit pair to the maximum allowed average amplitude ($\gamma_i$) is determined based on a table given by:

| bit-pair $b_2^{(k,2(N_1x_2+x_1)+1)} b_2^{(k,2(N_1x_2+x_1))}$ | Maximum allowed average amplitude ($\gamma_i$) |
|---|---|
| 00 | 0 |
| 01 | $\sqrt{1/4} = \sqrt{0.25}$ |
| 10 | $\sqrt{1/2} = \sqrt{0.5}$ |
| 11 | 1. |

7. The UE of claim 6, wherein a bit-pair value $b_2^{(k,2(N_1x_2+x_1)+1)} b_2^{(k,2(N_1x_2+x_1))} =01$ or 10 is not configured via the CBSR information if the UE does not report that it is capable of supporting amplitude restriction in its capability signalling.

8. A base station (BS) in a wireless communication system, the BS comprising:
a processor configured to generate higher layer signaling including codebook subset restriction (CBSR) information; and
a transceiver operably connected to the processor, the transceiver configured to:
transmit, to a user equipment (UE), the higher layer signaling including the codebook subset restriction (CBSR) information, and
receive, from the UE, a channel state information (CSI) report;
wherein a bitmap sequence B is determined based on the CBSR information,
wherein a restriction on P spatial domain (SD) vector groups out of a total of Q SD vector groups is identified based on a portion of the bitmap sequence B,
wherein the CSI report is generated based on the P SD vector groups with the identified restriction and remaining Q minus P SD vector groups without any restrictions, and
wherein the restriction on P SD vector groups corresponds to restricting an average amplitude ($A_i^{avg}$) associated with an SD vector $a_i$ in the P SD vector groups to a maximum allowed average amplitude ($\gamma_i$).

9. The BS of claim 8, wherein the average amplitude ($A_i^{avg}$) associated with an SD vector $a_1$ is determined as a square root of an average power ($P_i^{avg}$), where the average power ($P_i^{avg}$) is determined by averaging $P_{i,m}$ over M frequency domain (FD) indices, $m=0, 1, \ldots, M-1$, and $P_{i,m}$ is a power of a coefficient with an SD index i and a FD index m.

10. The BS of claim 9, wherein:
the coefficient with an SD index i and a FD index m is $c_{i,m}$,
the power ($P_{i,m}$) of the coefficient $c_{i,m}$ equals a square of $p_{i,m}$, where $p_{i,m}$ is an amplitude of the coefficient $c_{i,m}$,
the average power $$P_i^{avg} = \frac{1}{n}\sum_{m=0}^{M-1} P_{i,m} = \frac{1}{n}\sum_{m=0}^{M-1} p_{i,m}^2,$$

and
the restriction on the average amplitude ($A_i^{avg}$) is applied as follows:

$$A_i^{avg} = \sqrt{\frac{1}{n}\sum_{m=0}^{M-1} p_{i,m}^2} \le \gamma_i,$$

where n is a normalization factor.

11. The BS of claim 9, wherein, for each layer $l=1, \ldots, \upsilon$, where $\upsilon$ is a rank value:

the coefficient with an SD index i and a FD index m is $c_{l,i,m}$, the power ($P_{i,m}$) of the coefficient $c_{l,i,m}$, equals a square of $p_{l,i,m}$, where $$p_{l,i,m} = p^{(1)}_{l,\lfloor\frac{i}{L}\rfloor} p^{(2)}_{l,i,m}$$

is an amplitude of the coefficient $c_{l,i,m}$, where $\lfloor\ \rfloor$ is a flooring function, the average power $$P_i^{avg} = \frac{1}{n}\sum_{m=0}^{M-1} P_{i,m} = \frac{1}{\sum_{m=0}^{M-1} b_{l,i,m}} \sum_{m=0}^{M-1} b_{l,i,m} p^2_{l,i,m},$$

and the restriction on the average amplitude ($A_i^{avg}$) is applied as follows:

$$A_i^{avg} = \sqrt{\frac{1}{\sum_{m=0}^{M-1} b_{l,i,m}} \sum_{m=0}^{M-1} b_{l,i,m} p^2_{l,i,m}} \leq \gamma_i,$$

where n is a number of non-zero coefficients associated with an index i such that $$n = \sum_{m=0}^{M-1} b_{l,i,m}, \text{ and}$$

where $b_{l,i,m}=1$ if $c_{l,i,m}$ is non-zero and $b_{l,i,m}=0$ if $c_{l,i,m}$ is zero.

12. The BS of claim 11, wherein the CSI report includes a precoding matrix indicator (PMI) indicating, for each layer l=1, ..., υ, a precoding vector for each FD unit of a total number ($N_3$) of FD units as determined by columns of $$W^l = \begin{bmatrix} \sum_{i=0}^{L-1} a_i \sum_{m=0}^{M-1} c_{l,i,m}(b^H_{l,m}) \\ \sum_{i=0}^{L-1} a_i \sum_{m=0}^{M-1} c_{l,i+L,m}(b^H_{l,m}) \end{bmatrix},$$

wherein:

$a_i$, i=0, 1, ..., L-1, are L SD vectors, $b_{l,m}$, m=0, 1, ..., M-1, are M FD vectors for layer l, $c_{l,i+pL,m}$, i=0, 1, ..., L-1, p=0, 1, and m=0, 1, ..., M-1, are 2LM coefficients for layer l, and the restriction on the average amplitude associated with an SD vector $a_i$ in the P SD vector groups is applied as follows:

$$\sqrt{\frac{1}{\sum_{m=0}^{M-1} b_{l,i+pL,m}} \sum_{m=0}^{M-1} b_{l,i+pL,m}(p^{(1)}_{l,p} p^{(2)}_{l,i,m})^2} \leq \gamma_{i+pL}.$$

13. The BS of claim 8, wherein:

the portion of the bitmap sequence B equals $B_2 = B_2^{(1)} B_2^{(2)} \ldots B_2^{(P)}$, a concatenation of P bitmaps $B_2^{(k)}$ for k=0, 1, ..., P-1;

the restriction on a k-th SD vector group of the P SD vector groups is indicated via a k-th bitmap $B_2^{(k)}$ of the P bitmaps;

the k-th bitmap $B_2^{(k)} = b_2^{(k,2N_1N_2-1)} \ldots b_2^{(k,0)}$ is of length $2N_1N_2$, where a bit pair $b_2^{(k,2(N_1x_2+x_1)+1)}$, $b_2^{(k,2(N_1x_2+x_1))}$ indicates the maximum allowed average amplitude ($\gamma_i$) for an SD vector $a_i$ indexed by i=($x_1$, $x_2$) in the k-th SD vector group of the P SD vector groups, where $N_1$ and $N_2$ are higher layer configured; and a mapping of the bit pair to the maximum allowed average amplitude ($\gamma_i$) is determined based on a table given by:

| bit-pair $b_2^{(k,2(N_1x_2+x_1)+1)} b_2^{(k,2(N_1x_2+x_1))}$ | Maximum allowed average amplitude ($\gamma_i$) |
|---|---|
| 00 | 0 |
| 01 | $\sqrt{1/4} = \sqrt{0.25}$ |
| 10 | $\sqrt{1/2} = \sqrt{0.5}$ |
| 11 | 1. |

14. The BS of claim 13, wherein a bit-pair value $b_2^{(k,2(N_1x_2+x_1)+1)} b_2^{(k,2(N_1x_2+x_1))} = 01$ or 10 is not configured via the CBSR information if the UE does not report that it is capable of supporting amplitude restriction in its capability signalling.

15. A method for operating a user equipment (UE) for channel state information (CSI) reporting in a wireless communication system, the method comprising:

receiving, from a base station (BS), higher layer signaling including codebook subset restriction (CBSR) information;

determining a bitmap sequence B based on the CBSR information;

identifying, based on a portion of the bitmap sequence B, a restriction on P spatial domain (SD) vector groups out of a total of Q SD vector groups;

generating a CSI report based on the P SD vector groups with the identified restriction and remaining Q minus P SD vector groups without any restrictions; and transmitting the CSI report to the BS, wherein the restriction on P SD vector groups corresponds to restricting an average amplitude ($A_i^{avg}$) associated with an SD vector $a_i$ in the P SD vector groups to a maximum allowed average amplitude ($\gamma_i$).

16. The method of claim 15, wherein the average amplitude ($A_i^{avg}$) associated with an SD vector $a_i$ is determined as a square root of an average power ($P_i^{avg}$), where the average power ($P_i^{avg}$) is determined by averaging $P_{i,m}$ over M frequency domain (FD) indices, m=0, 1, ..., M-1, and $P_{i,m}$ is a power of a coefficient $c_{i,m}$ with a SD index i and a FD index m.

17. The method of claim 16, wherein:
the coefficient with an SD index i and a FD index m is $c_{i,m}$,
the power ($P_{i,m}$) of the coefficient $c_{i,m}$ equals a square of $p_{i,m}$, where $p_{i,m}$ is an amplitude of the coefficient $c_{i,m}$,
the average power and $$P_i^{avg} = \frac{1}{n} \sum_{m=0}^{M-1} P_{i,m} = \frac{1}{n} \sum_{m=0}^{M-1} p_{i,m}^2,$$

the restriction on the average amplitude ($A_i^{avg}$) is applied as follows:

$$A_i^{avg} = \sqrt{\frac{1}{n} \sum_{m=0}^{M-1} p_{i,m}^2} \leq \gamma_i,$$

where n is a normalization factor.

18. The method of claim 16, wherein, for each layer l=1, ..., υ, where υ is a rank value:
the coefficient with an SD index i and a FD index m is $c_{l,i,m}$,
the power ($P_{i,m}$) of the coefficient $c_{l,i,m}$ equals a square of $p_{l,i,m}$, where $$p_{l,i,m} = p_{l,\lfloor \frac{i}{L} \rfloor}^{(1)} p_{l,i,m}^{(2)}$$

is an amplitude of the coefficient $c_{l,i,m}$, where $\lfloor \; \rfloor$ is a flooring function,
the average power $$P_i^{avg} = \frac{1}{n} \sum_{m=0}^{M-1} P_{i,m} = \frac{1}{\sum_{m=0}^{M-1} b_{l,i,m}} \sum_{m=0}^{M-1} b_{l,i,m} p_{l,i,m}^2,$$

and
the restriction on the average amplitude ($A_i^{avg}$) is applied as follows:

$$A_i^{avg} = \sqrt{\frac{1}{\sum_{m=0}^{M-1} b_{l,i,m}} \sum_{m=0}^{M-1} b_{l,i,m} p_{l,i,m}^2} \leq \gamma_i,$$

where n is a number of non-zero coefficients associated with an SD index i such that $$n = \sum_{m=0}^{M-1} b_{l,i,m}, \text{ and}$$

where $b_{l,i,m}=1$ if $c_{l,i,m}$ is non-zero and $b_{l,i,m}=0$ if $c_{l,i,m}$ is zero.

19. The method of claim 18, wherein the CSI report includes a precoding matrix indicator (PMI) indicating, for each layer l=1, ..., υ, a precoding vector for each FD unit of a total number ($N_3$) of FD units as determined by columns of $$W^l = \begin{bmatrix} \sum_{i=0}^{L-1} a_i \sum_{m=0}^{M-1} c_{l,i,m}(b_{l,m}^H) \\ \sum_{i=0}^{L-1} a_i \sum_{m=0}^{M-1} c_{l,i+L,m}(b_{l,m}^H) \end{bmatrix},$$

wherein:
$a_i$, i=0, 1, ..., L−1, are L SD vectors,
$b_{l,m}$, m=0, 1, ..., M−1, are M FD vectors for layer l,
$c_{l,i+pL,m}$, i=0, 1, ..., L−1, p=0, 1, and m=0, 1, ..., M−1, are 2LM coefficients for layer l, and
the restriction on the average amplitude associated with an SD vector $a_i$ in the P SD vector groups is applied as follows:

$$\sqrt{\frac{1}{\sum_{m=0}^{M-1} b_{l,i+pL,m}} \sum_{m=0}^{M-1} b_{l,i+pL,m}(p_{l,p}^{(1)} p_{l,i,m}^{(2)})^2} \leq \gamma_{i+pL}.$$

20. The method of claim 15, wherein:
the portion of the bitmap sequence B equals $B_2 = (B_2^{(1)} B_2^{(2)} \ldots B_2^{(P)})$, a concatenation of P bitmaps $B_2^{(k)}$ for k=0, 1, ..., P−1;
the restriction on a k-th SD vector group of the P SD vector groups is indicated via a k-th bitmap $B_2^{(k)}$ of the P bitmaps;
the k-th bitmap $B_2^{(k)} = b_2^{(k,2N_1N_2-1)} \ldots b_2^{(k,0)}$ is of length $2N_1N_2$, where a bit pair $b_2^{(k,2(N_1x_2+x_1)+1)}$, $b_2^{(k,2(N_1x_2+x_1))}$ indicates the maximum allowed average amplitude ($\gamma_i$) for an SD vector $a_i$ indexed by i=($x_1$, $x_2$) in the k-th SD vector group of the P SD vector groups, where $N_1$ and $N_2$ are higher layer configured; and
a mapping of the bit pair to the maximum allowed average amplitude ($\gamma_i$) is determined based on a table given by:

| bit-pair $b_2^{(k,2(N_1x_2+x_1)+1)} b_2^{(k,2(N_1x_2+x_1))}$ | Maximum allowed average amplitude ($\gamma_i$) |
|---|---|
| 00 | 0 |
| 01 | $\sqrt{1/4} = \sqrt{0.25}$ |
| 10 | $\sqrt{1/2} = \sqrt{0.5}$ |
| 11 | 1. |

* * * * *